United States Patent [19]

Wilkerson

[11] Patent Number: 4,757,416

[45] Date of Patent: Jul. 12, 1988

[54] PROTECTIVE APPARATUS, METHODS OF OPERATING SAME AND PHASE WINDOW ADJUSTING APPARATUS FOR USE THEREIN

[75] Inventor: Timothy M. Wilkerson, Madison County, Ill.

[73] Assignee: Basler Electric Company, Highland, Ill.

[21] Appl. No.: 902,298

[22] Filed: Aug. 29, 1986

Related U.S. Application Data

[63] Continuation-in-part of Ser. No. 881,181, Jul. 1, 1986.

[51] Int. Cl.⁴ .............................................. H02H 3/26
[52] U.S. Cl. ......................................... 361/84; 361/85; 361/86; 361/91; 340/658; 340/660
[58] Field of Search ......................... 361/71, 72, 74, 75, 361/85, 86, 76, 82, 84, 91; 340/660, 661, 662, 663, 658

[56] References Cited

U.S. PATENT DOCUMENTS

| | | | |
|---|---|---|---|
| 3,597,735 | 8/1971 | Nakayama | 340/825 |
| 3,831,061 | 8/1974 | Boyd | 361/94 |
| 4,293,886 | 10/1981 | Church et al. | 361/71 |
| 4,535,409 | 8/1985 | Jindrick et al. | 361/71 X |
| 4,538,196 | 8/1985 | Sun et al. | 361/64 |
| 4,538,197 | 8/1985 | Breen | 361/71 |
| 4,604,674 | 8/1986 | Hamel | 361/73 |

OTHER PUBLICATIONS

Westinghouse, *Applied Protective Relaying*, 1982, cover sheet, face sheet, pp. 16-26, 16-27, 20-1, 20-2, 20-11 and 20-12.

*Primary Examiner*—A. D. Pellinen
*Assistant Examiner*—H. L. Williams
*Attorney, Agent, or Firm*—Senniger, Powers, Leavitt and Roedel

[57] ABSTRACT

A protective apparatus for use in an A.C. electrical power system with a circuit breaker for connecting and disconnecting first and second electrical conductors that are electrically energizable, the conductors normally having a negligible phase difference of electrical energization when the circuit breaker is closed, and the circuit breaker having auxiliary contacts defining the state of the circuit breaker as open or closed. The protective apparatus includes a circuit responsive to the auxiliary contacts for producing a first signal representative of the state of the breaker as open or closed and another circuit connected to the circuit for producing the first signal and operable when the breaker is closed for generating a second signal when the phase difference of electrical energization of the first and second electrical conductors exceeds a predetermined value. A further circuit provides an indication of malfunction of the circuit breaker when the second signal occurs. Phase window extending apparatus for use in the protective apparatus, methods of operation and other protective apparatus are also disclosed.

45 Claims, 11 Drawing Sheets

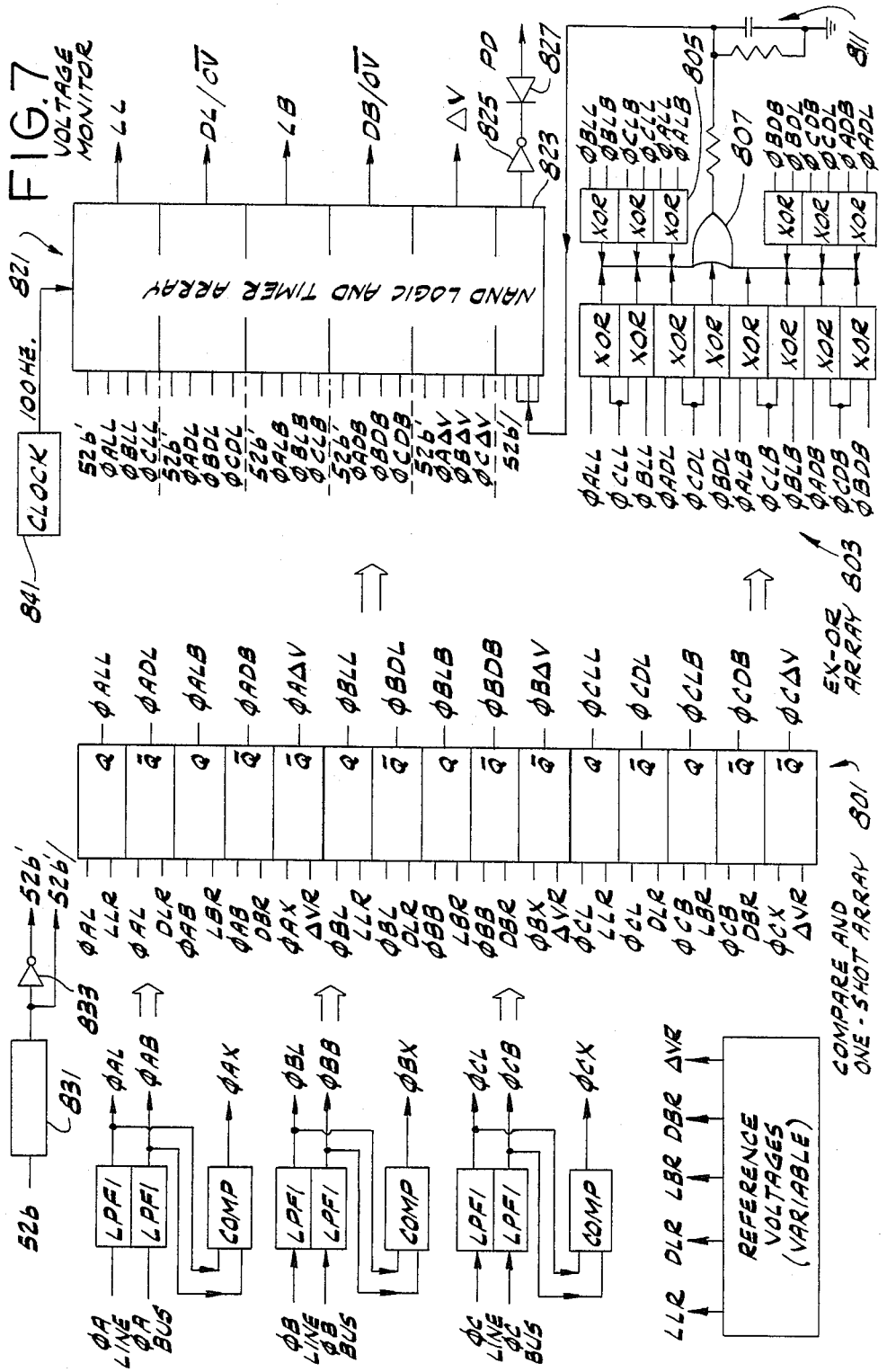

LPF1

COMPARE AND ONE-SHOT CIRCUIT

NAND LOGIC AND TIMER

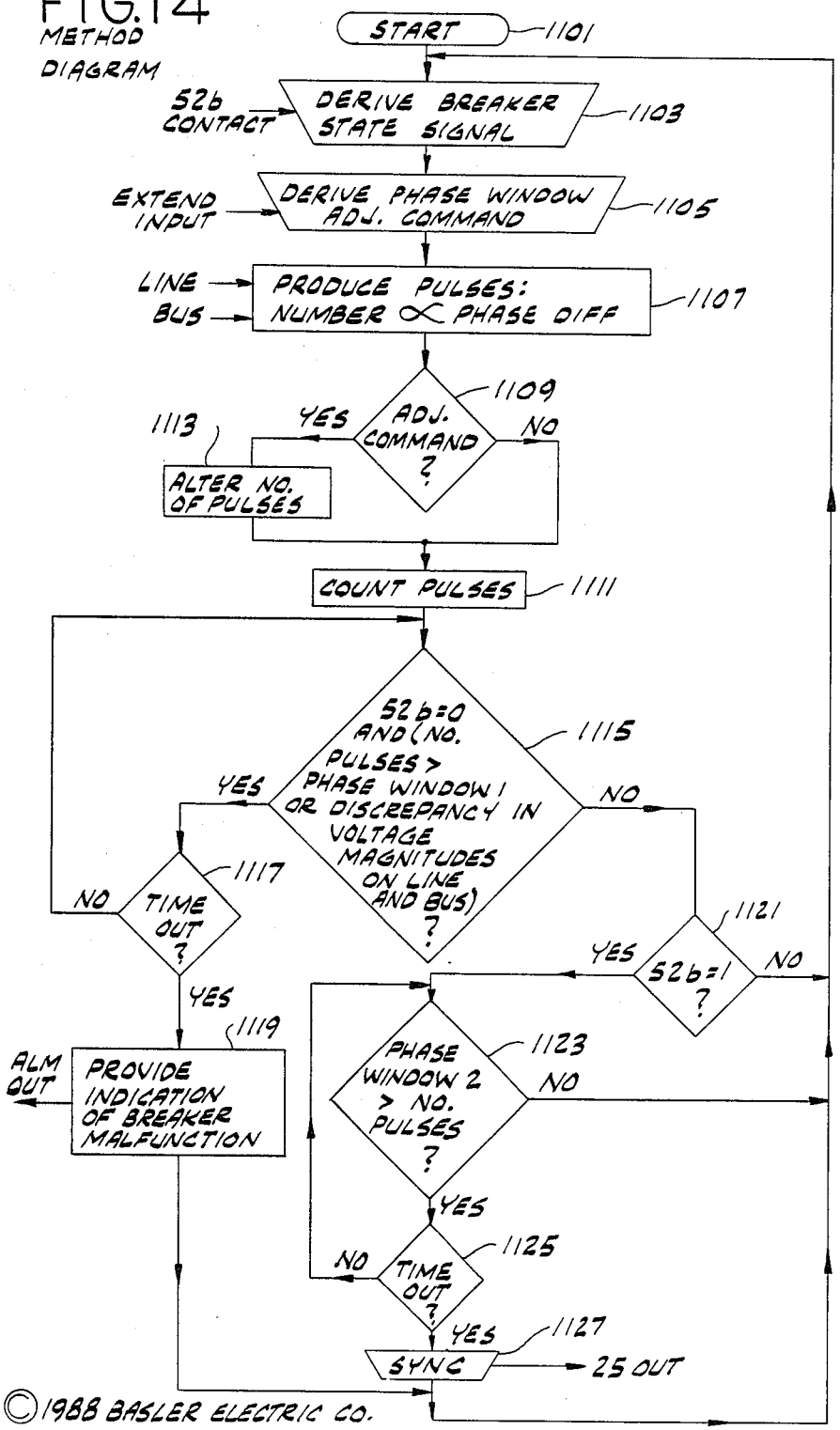

PROTECTIVE APPARATUS, METHODS OF OPERATING SAME AND PHASE WINDOW ADJUSTING APPARATUS FOR USE THEREIN

CROSS-REFERENCE TO RELATED APPLICATION

This application is a continuation-in-part of coassigned, copending application Ser. No. 881,181 for "Reclosing Relays and Methods" filed July 1, 1986, which is incorporated by reference herein.

BACKGROUND OF THE INVENTION

The present invention relates to improved protective apparatus and methods of operation to monitor or control the operation of a power circuit breaker in electrical power transmission and distribution systems. In particular, the present invention relates to protective apparatus for checking the phase difference on line and bus sides of a closed circuit breaker, phase window adjusting apparatus, protective apparatus for checking for a discrepancy between the voltage magnitudes on the individual conductors of the line and bus when the breaker is closed, and methods of operation of the foregoing apparatus.

Three-phase alternating current (AC) systems are widely used for transmission and distribution of electric power. Faults on overhead electric power lines are generally cleared by momentarily de-energizing the line. The momentary power cutoff is accomplished by a three-phase circuit breaker, which is opened or tripped by an overload or other fault-detecting relay when an overload due to a fault is sensed. The condition of the breaker as open or closed is indicated by auxiliary contacts on the breaker conventionally designated in the industry as "52a" and "52b" contacts. The 52a contact is closed only when the breaker is closed, and the 52b contact is closed only when the breaker is open.

Automatically reclosing the breaker, after the fault clears, provides improved system stability and electric service continuity for the consumer. This, in turn, allows higher line loading by decreasing the likelihood of line loss. A microprocessor-based system for accomplishing automatic reclosing relay functions is described in detail in the coassigned application Ser. No. 881,181 cross-referenced hereinabove.

If conductors on both the line and bus sides of the breaker are energized at the time when the breaker is to be closed, they should be in approximate electrical synchronism and voltage match to avoid system shock. This is because the electrical quantities of voltage and current on the line and bus are alternating waveforms that have a phase difference that is between zero (synchronism) and ±180 degrees. Reclosing a circuit breaker when the line and bus are substantially out of synchronism or voltage match presents a condition resembling a temporary short circuit to the system. To avoid this condition, it has been known to use a synchronism check relay as an element in a reclosing system which senses that the voltages on the two sides of a breaker are in exact synchronism, see *Applied Protective Relaying*, Westinghouse 1982, chapter 20, e.g. page 20-2. Basler Electric Company of Highland, Ill., manufactures a synchronism check (sync-check) relay model BEl-25 that monitors for synchronism and voltage match before the breaker is allowed to close. Synchronism is determined when the phase difference across the open breaker is less than a manually-set amount called a phase window. A voltage monitor option is provided in that relay for determining a live or dead condition of the line and bus.

When a three-phase circuit breaker is closed, three conductive members therein connect first and second electrical conductors for each of three conductors A, B and C of the line and bus respectively. The circuit breaker may malfunction or connections thereto may fail over time, however, so that one or more of the electrical connections are not in fact made by the breaker when the auxiliary contacts indicate that it is closed. It would be desirable to provide economical and alternative ways of monitoring the circuit breaker for malfunction that are more compatible with reclosing and sync-check circuits than prior art breaker pole disagreement protection using current transformers described in *Applied Protective Relaying*, Chapter 16, pages 26-27.

The synchronism check relay is often located in an unattended location or used when manual adjustment of the phase window is not practical during various operating contingencies when a change of the phase window would be useful. There also is presently a need for improved apparatus and methods for effectively adjusting the phase window more conveniently.

SUMMARY OF THE INVENTION

Among the objects of the present invention are to provide improved protective apparatus and methods for checking a circuit breaker for proper operation when it is nominally closed; to provide improved protective apparatus and methods for checking a circuit breaker when closed that reuse circuitry which is operative for protective purposes when the circuit breaker is open; to provide improved phase window adjusting circuitry and methods for protective apparatus and improved protective apparatus which includes the improved phase window adjusting circuitry; and to provide improved protective apparatus, phase window adjusting circuitry and methods which are convenient to use, economical and reliable.

Generally, one form of the invention is a protective apparatus for use in an A.C. electrical power system with a circuit breaker for connecting and disconnecting first and second electrical conductors that are electrically energizable, the conductors normally having a negligible phase difference of electrical energization when the circuit breaker is closed, and the circuit breaker having auxiliary contacts defining the state of the circuit breaker as open or closed. The protective apparatus includes a circuit responsive to the auxiliary contacts for producing a first signal representative of the state of the breaker as open or closed and another circuit connected to the circuit for producing the first signal and operable when the breaker is closed for generating a second signal when the phase difference of electrical energization of the first and second electrical conductors exceeds a predetermined value. A further circuit provides an indication of malfunction of the circuit breaker when the second signal occurs.

In general, another form of the invention is a protective apparatus for use in an A.C. electrical power system with a circuit breaker for connecting and disconnecting electrically energizable conductors of a polyphase line from corresponding electrically energizable conductors of a polyphase bus, the circuit breaker having auxiliary contacts defining the state of the circuit breaker as open or closed. The protective apparatus includes a circuit responsive to the auxiliary contacts for producing a first signal representative of the state of the breaker as open or closed and another circuit connected to the circuit for producing the first signal and operable when the breaker is closed for providing a second signal when a discrepancy occurs in the magnitudes of the voltages of the line and bus. A further circuit provides an indication of malfunction of the circuit breaker when the second signal occurs.

Generally, a further form of the invention is used in protective apparatus that measures a phase difference between two electrical quantities by producing a series of pulses corresponding in number to the phase difference and the protective apparatus has a circuit that is responsive to a number of the pulses for supplying an output signal indicating whether or not a preestablished value representing a phase window exceeds the number of pulses representing the phase difference. This form of the invention is a phase window adjusting apparatus including a circuit for deriving a command signal indicating when the phase window is to be adjusted and another circuit responsive to the command signal and to the series of pulses for selectively altering the number of the pulses to which the output signal supplying circuit of the protective apparatus is to be responsive.

Generally, another form of a phase window adjusting apparatus of the invention includes a circuit for deriving a command signal indicating when the phase window is to be extended and another circuit responsive to the command signal for selectively preventing at least one of the pulses from affecting the output signal supplying circuit of the protective apparatus.

Yet another form of the invention generally is a protective apparatus having a circuit for measuring a phase difference between two electrical quantities by producing a series of pulses corresponding in number to the phase difference and a circuit responsive to the number of pulses for supplying an output signal indicating whether or not the phase difference is less than a preestablished value representing a phase window. Further included is a phase window adjusting circuit responsive to an external command signal for selectively preventing at least one of the pulses from the measuring circuit from affecting the output signal supplying circuit.

A method form of the invention involves the steps of deriving a command signal indicating when the phase window is to be adjusted and selectively altering in response to the series of pulses the number of pulses to which the output signal supplying circuit is responsive, when the command signal occurs.

Another method form of the invention involves a method of operating protective apparatus for use in an A.C. electrical power system with a circuit breaker for connecting and disconnecting electrically energizable conductors of a polyphase line from corresponding electrically energizable conductors of a polyphase bus, the circuit breaker having auxiliary contacts defining the state of the circuit breaker as open or closed. The method includes the steps of producing a first signal representative of the state of the breaker as open or closed, providing a second signal when the breaker is closed and a discrepancy occurs in the magnitudes of the voltages of the line and bus, and providing an indication of malfunction of the circuit breaker when the second signal occurs.

A further method form of the invention involves a method of operating protective apparatus for use in an A.C. electrical power system with a circuit breaker for connecting and disconnecting first and second electrical conductors that are electrically energizable, the conductors normally having a negligible phase difference of electrical energization when the circuit breaker is closed, the circuit breaker having auxiliary contacts defining the state of the circuit breaker as open or closed. The method includes the steps of producing a first signal representative of the state of the breaker as open or closed, generating a second signal when the breaker is closed and the phase difference of electrical energization of the first and second electrical conductors exceeds a predetermined value, and providing an indication of malfunction of the circuit breaker when the second signal occurs.

Other objects and features will be in part apparent and in part pointed out hereinafter.

BRIEF DESCRIPTION OF THE DRAWINGS

FIG. 7 is a block diagram of an inventive voltage monitor section of the inventive protective apparatus of FIG. 2 including inventive circuitry for detecting a voltage discrepancy between phases of the line and bus when the breaker is closed;

FIG. 14 is a diagram of steps of inventive methods used in operating the inventive apparatus of the foregoing FIGS. 1–13.

Corresponding reference characters indicate corresponding parts throughout the several views of the drawings.

DETAILED DESCRIPTION OF PREFERRED EMBODIMENTS

Figure 1:
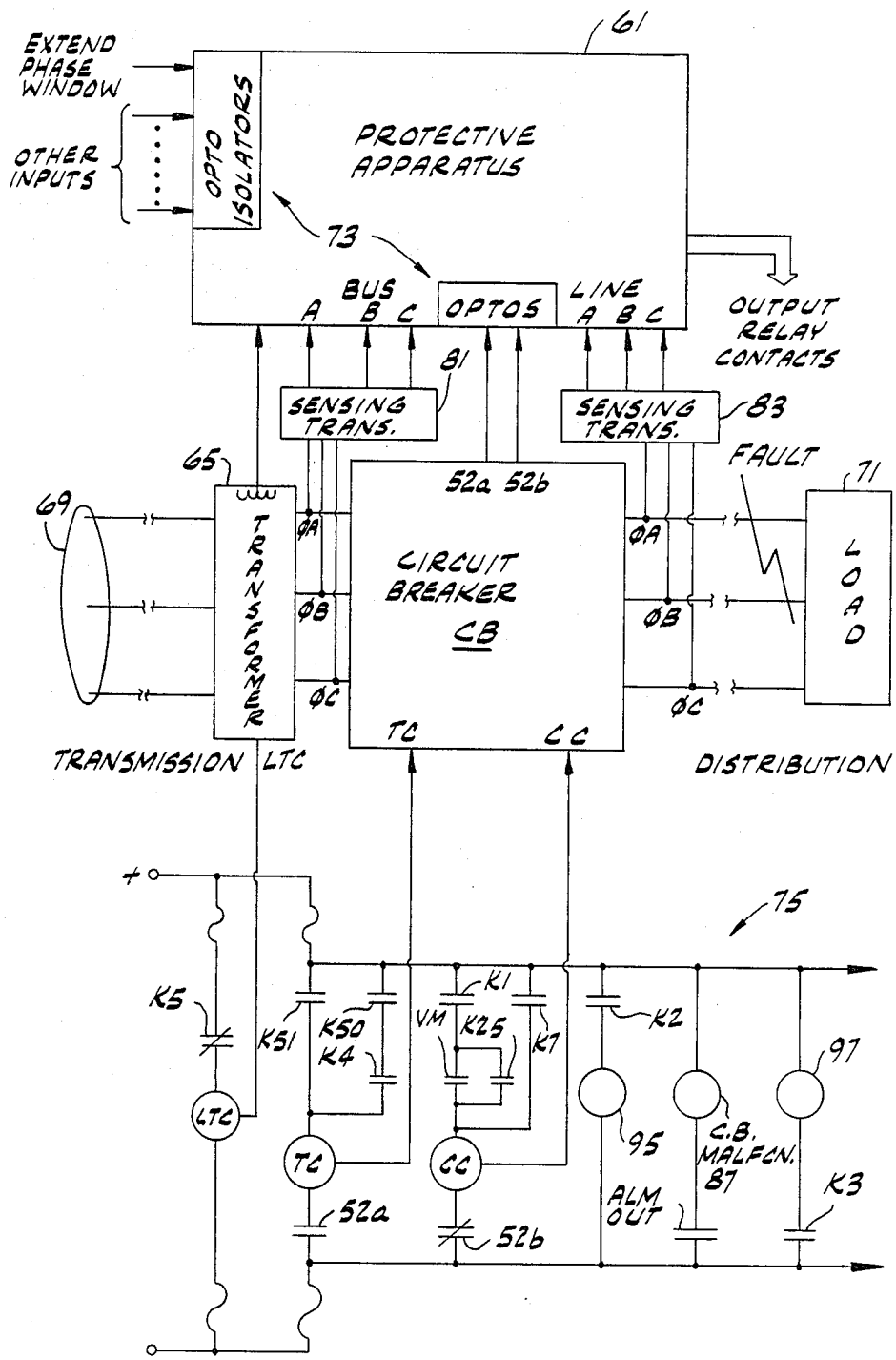
FIG. 1 is a partially block, partially schematic, diagram of an electrical power system equipped with inventive protective apparatus operating according to the methods of the invention and including phase window adjusting circuitry of the invention.

FIG. 1 shows a preferred embodiment of the inventive protective apparatus operating according to the inventive methods.

In FIG. 1 inventive protective apparatus 61 receives its power from a transformer 65 at a tertiary winding output thereof. Transformer 65 is connected on a high voltage side to a three phase transmission line 69. Transformer 65 is connected on a low voltage side through a three-phase bus to a circuit breaker CB which, upon occurrence of a fault, interrupts distribution line phases A, B and C to a load 71. Circuit breaker CB has a trip coil TC and a closing coil CC which when energized respectively trip the breaker CB or close it. The fault can often be cleared by appropriately tripping and reclosing the circuit breaker CB one or more times.

Circuit breaker CB has auxiliary contacts 52a which are closed when the breaker is closed. Breaker CB also has auxiliary contacts 52b which are closed when the breaker is open. In FIG. 1 auxiliary contacts 52b are connected to one of eleven optoisolators 73 in protective apparatus 61, and that optoisolator constitutes means responsive to the auxiliary contacts for producing a first signal representative of the state of the breaker as open or closed.

Protective apparatus 61 operates a set of Output Relay Contacts which are connected in a network 75 with other protective relay contacts to control circuit breaker CB and transformer 65 to clear the fault and to provide various alarms if necessary.

Protective apparatus 61 of FIG. 1 also acts like many timers, the periods of which can be set by selecting numbers on thumbwheel switches 81 on a front panel for reclosing relay purposes as in FIG. 8 of application Ser. No. 881,181. Examples of operations of protective apparatus 61 in its reclosing relay aspect have been described in detail in applicant's said cross-referenced application. detail in applicant In network 75 of FIG. 1, protective apparatus 61 closes contacts K1 and energizes breaker closing coil CC when contacts VM (voltage monitor for one or both lines dead) or K25 (sync on live line and bus) of a synchronism check relay included in apparatus 61 are closed. For voltage monitoring and sync-check purposes, voltage sensing transformers 81 and 83 of a conventional type are respectively connected from bus phases A, B and C to ABC bus inputs on protective apparatus 61 and from line phases A, B and C to ABC line inputs on apparatus 61.

Advantageously, protective apparatus 61 includes circuitry operable when the breaker is nominally closed for determining whether the breaker is malfunctioning. This circuitry reuses parts of the synchronism check relay circuitry to determine whether the phase B conductors for bus and line have a phase difference of electrical energization that exceeds a predetermined value (e.g. 10 electrical degrees). In a further advantageous feature, breaker malfunction is also sensed by additional circuitry that is also operable when the breaker is closed and reuses part of a voltage monitor circuit associated with the synchronism check relay in apparatus 61 and determines whether there is a discrepancy in the magnitudes of the voltages of the line and bus.

A preestablished value representing a phase window is set on thumbwheels for utilization by the sync check relay circuitry in apparatus 61 when the breaker is open. Another predetermined value representing another phase window is established for use by the additional circulatory in apparatus 61 for detecting breaker malfunction when the breaker is closed.

In a further important feature, an Extend Phase Window Input is provided to apparatus 61. When it is impractical to change the phase window values set on the thumbwheels or otherwise in the circuitry, actuation of the Extend Phase Window Input causes the values to be automatically extended by a predetermined multiple such as 2 or 3. In this way various operating contingencies are accommodated by supervisory control of the Extend Phase Window Input so that the breaker can be reclosed with a relaxed synchronism requirement when the breaker is open, or so that the phase window is extended for breaker malfunction monitoring purposes.

If excessive phase difference or voltage discrepancy is detected by apparatus 61 when the breaker is closed, then an Alarm Output ALM OUT contact closes in network 75, causing a C.B. MALFUNCTION warning alarm 87 to operate.

If the breaker CB does not close within a settable time period called Reclose Fail Time after a command to reclose has been sent by closing reclose output K1 contacts, the reclosing relay in protective apparatus 61 locks out and opens the reclose output contacts K1. Output contacts K2 close and actuate a lockout alarm 95 of FIG. 1. Also, output contacts K3 close and actuate a reclose fail alarm 97. Various other contacts in network 75 are described in the cross-referenced application.

Figure 2:
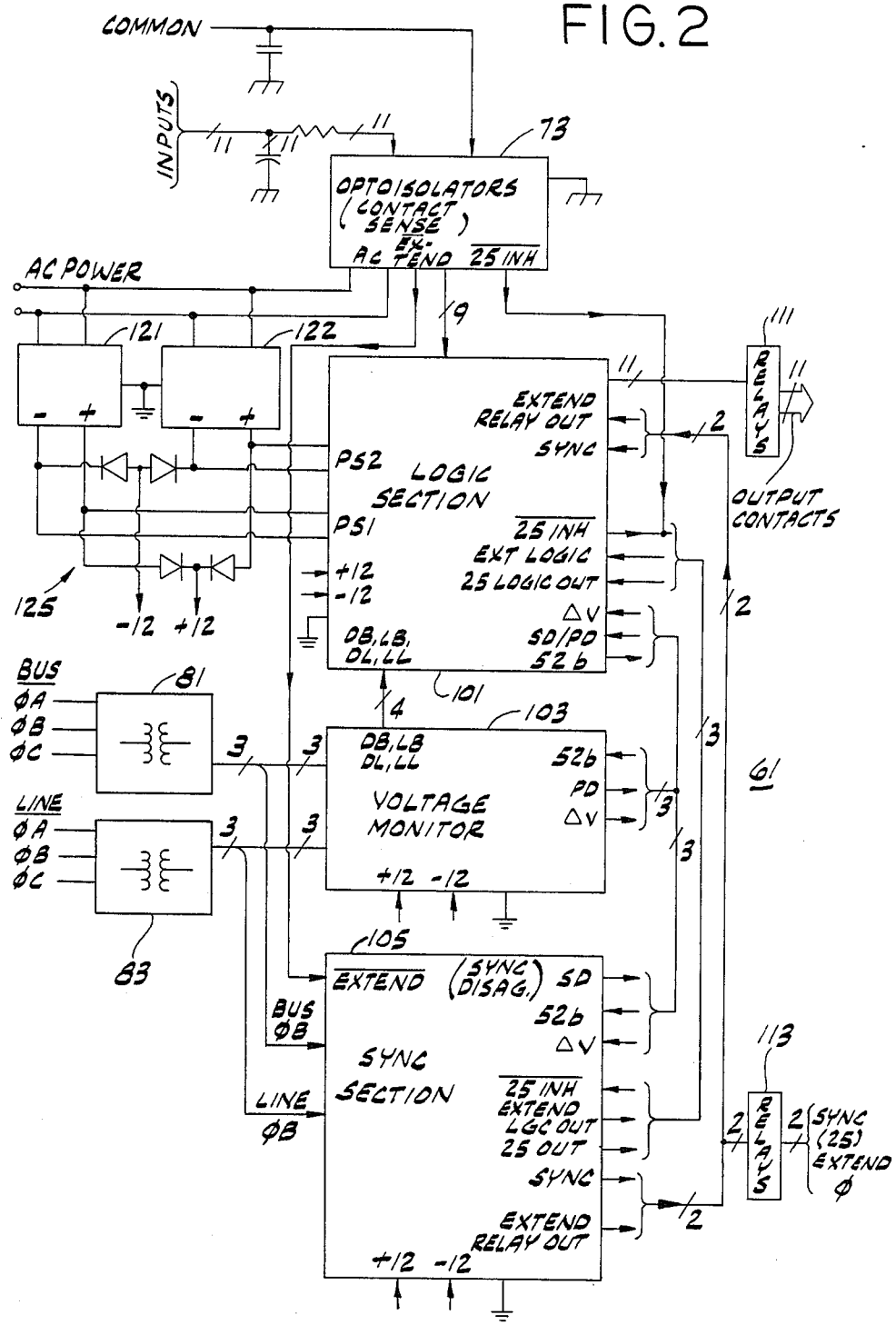
FIG. 2 is a partially block, partially schematic, diagram of the inventive protective apparatus of FIG. 1 including a synchronism section, a voltage monitor section, and a logic section.

FIG. 2 shows a block diagram of protective apparatus 61 with sensing transformers 81 and 83. Protective apparatus 61 includes optoisolators 73 (also called a Contact Sense section), a Logic Section 101 based on the microcomputer circuitry of the cross-referenced application, a Voltage Monitor 103, and a Sync Section 105 for sync check purposes. A pair of power supplies 121 and 122 are connected for advantageous redundancy to a source of AC power. Plus and minus 12 volt outputs from each power supply 121 and 122 are connected through a diode network 125 to power the Logic Section 101, Voltage Monitor 103 and Snyc Section 105.

Eleven inputs to the Contact Sense section 73 are tabulated below:

TABLE I

| Input | Remarks |
|---|---|
| Extend | Adjust phase window: Input |
| 52b | contact closed: Breaker open |
| 52a | contact closed: Breaker closed |
| PRI | Pilot Reclose Initiate Input |
| DTL | Drive to Lockout Input |
| REC INH | Reclose Inhibit Input |
| REC INH RES | Reclose Inhibit Reset Input |
| IRB | Instantaneous Reclose Bypass |
| LL-DB | Live Line, Dead Bus Input |
| DL-LB | Dead Line, Live Bus |

TABLE I-continued

| Input | Remarks |
|---|---|
| LL-LB In Sync | Input Live Line, Live Bus In Sync |

Thirteen output contacts of protective apparatus 61 from a set of 11 relays 111 and a pair of relays 113 are tabulated below:

TABLE II

| Output Contacts | Remarks |
|---|---|
| ALM OUT | Circuit Breaker Malfunction (Phase Difference Excessive or Voltage Discrepancy) |
| EXT | Extend Output Contacts (Phase Window Adjust) |
| 25 Relay Out | Sync Output Contacts |
| K1 | Reclose Output |
| K2 | Lockout |
| K3 | Reclose Fail Alarm when breaker does not close on command |
| K4 | Instantaneous Trip Enable (ITEO) |
| K5 | Block Load Tap Changer (BLTC) |
| K7 | Pilot Output |
| VM | Voltage Monitor Contacts |
| DL-DB | DL-DB Contacts |
| REC RST INT | Reclosing Reset Initiated |
| P.S. Alarm | Power Supply Alarm |

Many of the inputs and outputs tabulated hereinabove are common to this application and the cross-referenced application, and their purpose and use are as described in the cross-referenced application.

In FIG. 2 the Extend Phase Window Input is optoisolated by one of optoisolators 73 and supplied to an EXTEND/ low active input of Sync Section 105. For convenience, Sync Section 105 has logic and relay outputs EXTEND LGC OUT and EXTEND RELAY OUT that are activated by the EXTEND/ command for display purposes.

A sync check inhibit (25 INH/) from another one of the optoisolators 73 is wire-ORed with a similar inhibit output from Logic Section 101 and fed to a 25 INH/ input of Sync Section 105. A third of optoisolators 73 has a 52b contact input which in turn is fed to Logic Section 101 which then sends a logic level corresponding to 52b to both Voltage Monitor 103 and Sync Section 105.

Bus phase conductors A, B and C are connected to a delta-wye sensing transformer circuit 81 having three outputs connected to Voltage Monitor circuit 103. Line phase conductors A, B and C are connected to another delta-wye sensing transformer circuit 83 having three outputs also connected to Voltage Monitor circuit 103. Respective outputs from each circuit 81 and 83 corresponding to bus phase conductor B and line phase conductor B are connected to Sync Section 105. In this embodiment these phase conductors B of the line and bus constitute first and second electrical conductors that are electrically energizable, the conductors normally having a negligible phase difference of electrical energization when the circuit breaker is closed.

Sync Section 105 performs a sync check function and operates when the breaker is open (52b=logic high) and 25 INH/ is inactive high to generate a synchronism logic level 25 OUT and actuate a SYNC relay when the phase difference between the voltages of line phase B and bus phase B is less than a preestablished value set on thumbwheels.

Advantageously, Sync Section 105 also operates when the breaker is closed (52b=logic low) to generate a signal SD (Sync Disagreement) if and when the phase difference between the voltages of line phase B and bus phase B is greater than another preestablished value such as 10 electrical degrees.

Voltage Monitor circuit 103 is operable when the breaker is open to generate signals for Logic Section 101 representative of the voltage states of the line as live (LL) or dead (DL) and of the bus as live (LB) or dead (DB). Also a signal delta-V is generated to indicate an excessive vector voltage difference, if it occurs, between line and bus.

Advantageously Voltage Monitor circuit 103 is also operable when the breaker is closed (52b=0) to provide a signal PD (Potential Disagreement) when a discrepancy occurs in the magnitudes of the voltages of the line and bus. Here there are six such voltages for the three phase conductors of the line and the three phase conductors of the bus in the polyphase electrical power system of FIG. 1.

The SD output from Sync Section 105 is wire-ORed with the PD output from Voltage Monitor circuit 103 and connected to Logic Section 101 as an input SD/PD. The microcomputer in Logic Section 101 is programmed with a conventional timing routine to additionally operate as a timer (e.g. 5 second timing interval) so that the Alarm Output contact ALM OUT of FIG. 1 is actuated when the SD/PD input has a low that persists through a full timing interval. Thus Logic Section 101 is an example of a means for providing an indication of breaker malfunction including means for producing the indication when either the SD signal or the PD signal occurs.

Figure 3:
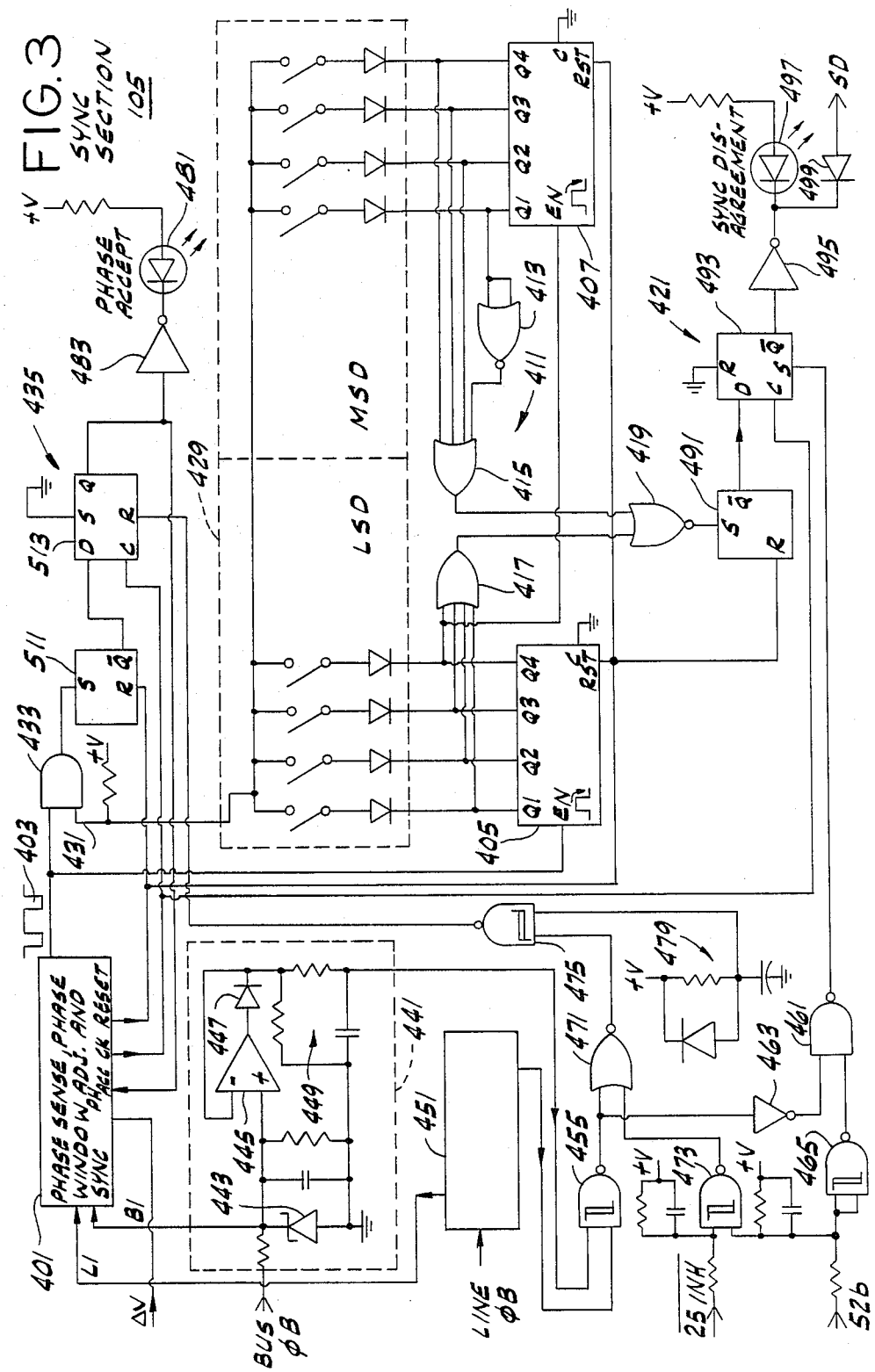
FIG. 3 is a schematic diagram of the synchronism section of the inventive protective apparatus of FIG. 2, showing an inventive sync disagreement circuit operable when the breaker is closed.
Figure 4:
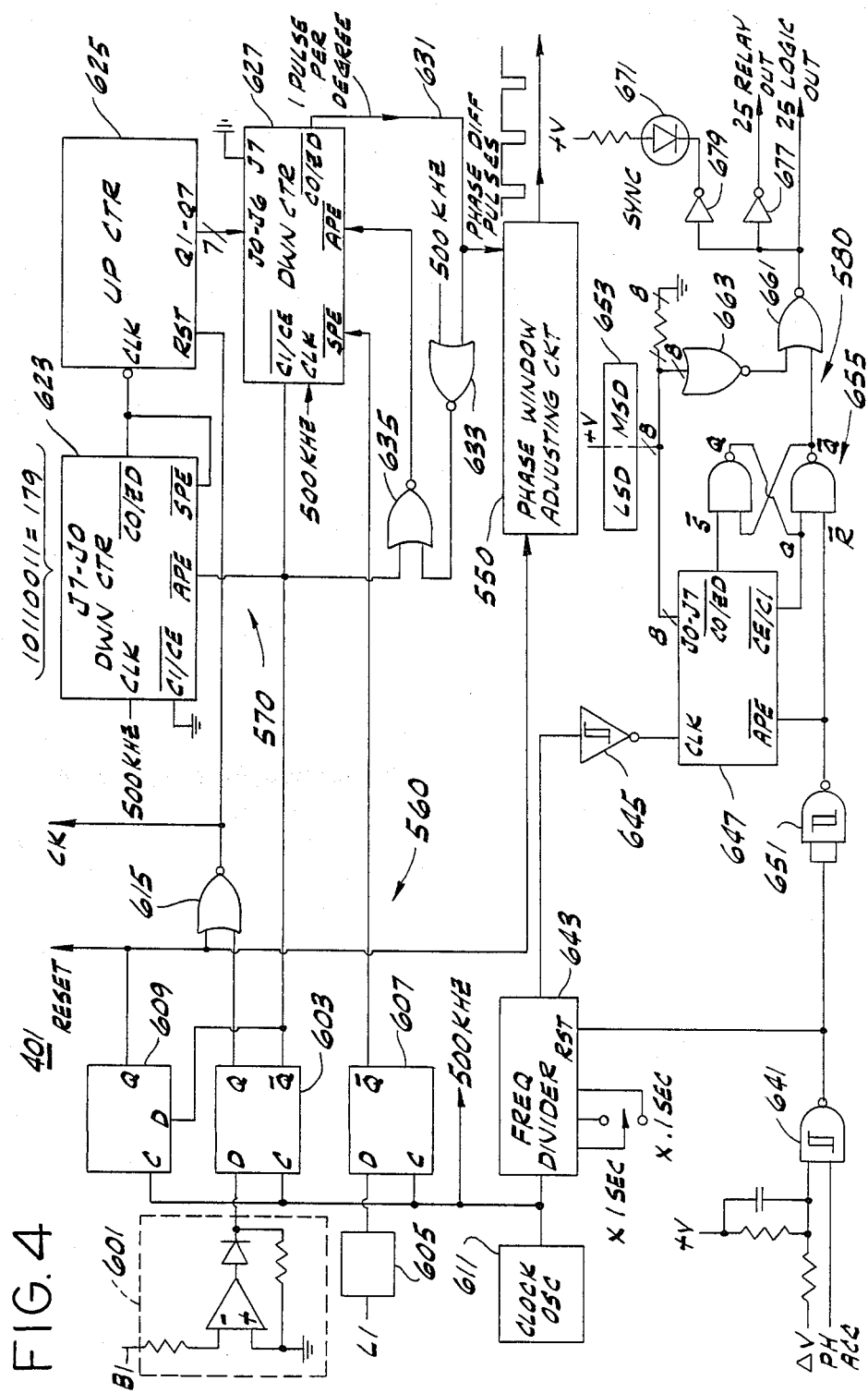
FIG. 4 is a partially block, partially schematic diagram of a circuit for phase sensing, phase window adjusting and sync timing in the synchronism section of FIG. 3.
Figure 5:
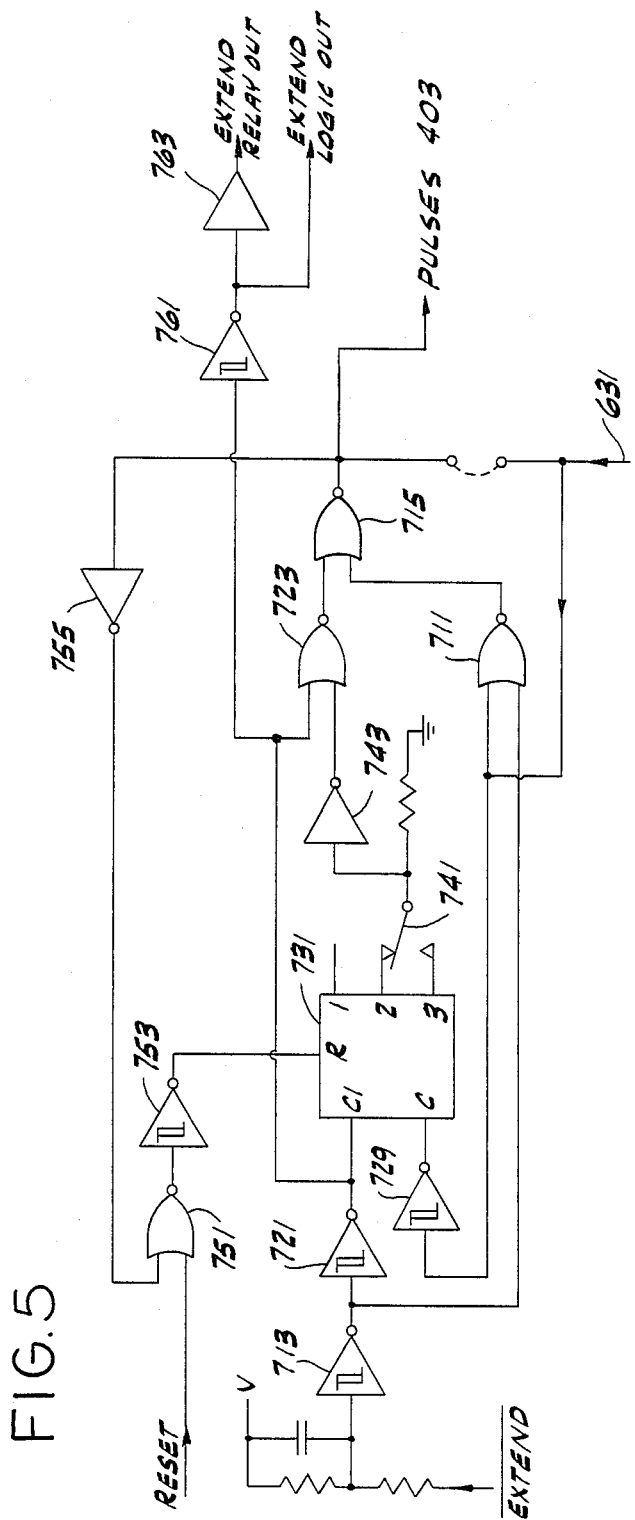
FIG. 5 is a schematic diagram of an inventive circuit for phase window adjusting in the circuit of FIG. 4.

Schematic diagrams of FIGS. 3-5 detail the inventive circuitry of the Sync Section 105.

In FIG. 3 a circuit block. 401 represents phase sensing, phase window adjusting, and sync output circuitry of FIGS. 4 and 5. Circuit block 401 repeatedly produces series of pulses 403 in successive AC cycles. Each series of pulses has a pulse for each electrical degree of phase difference between the voltages of bus phase (conductor) B and line phase (conductor) B. In this way the number of pulses in each series corresponds to the number of electrical degrees of phase difference.

The pulses are fed to an enable EN input of a counting circuit having two cascaded BCD (binary coded decimal) up counters 405 and 407. Counters 405 and 407 produce a least significant 4 bit BCD digit and a most significant 4 bit BCD digit respectively at their Q1–Q4 outputs. All eight of the counter 405 and 407 outputs are connected to a decoder network 411 having an inverter 413, OR-gates 415 and 417 and a NOR-gate 419. Decoder network 411 establishes a predetermined number (10, ten) corresponding to a first phase window for breaker monitoring purposes. When the counter 405 and 407 outputs exactly match the predetermined number, the output of NOR-gate 419 goes high and thereby enables a sync disagreement circuit 421 that produces the SD output indicative of malfunction of the circuit breaker.

The Q1–Q4 outputs from each of counters 405 and 407 are also connected through a thumbwheel switch assembly 429 to one input 431 of an AND-gate 433 in sync check phase accept circuitry 435. Input 431 goes low only when the least significant digit LSD and most significant digit MSD set on thumbwheel switch 429, which establishes a second phase window for sync check purposes, are matched by the count at the Q1–Q4 outputs of counters 405 and 407.

A sensed bus phase conductor B sinusoidal voltage is conditioned by a circuit 441 having a zener diode 443 for clipping the sinusoidal voltage and supplying the clipped voltage to an input B1 of circuit 401. The clipped voltage is also supplied to an operational amplifier 445 followed by a half-wave rectifier diode 447 and filter 449. A sensed line phase conductor B sinusoidal voltage is conditioned by a circuit 451 which is identical in construction to circuit 441 and supplies a clipped voltage to an input L1 of circuit 401. The filter 449 outputs from each of circuits 441 and 451 are connected to the inputs of a Schmitt NAND gate 455, the output of which NAND gate goes low when both the line and bus are energized, or live.

The output of NAND gate 455 qualifies a NAND gate 461 through an inverter 463 when line and bus are live. A 52b input low indicative of breaker closed is inverted by a Schmitt inverter 465 and fed as a high to NAND gate 461 causing its output to go low and release a disabling high from Sync disagreement circuit 421. In this way gates 465 and 461 act as an example of means responsive to the auxiliary contacts for producing a first signal representative of the state of the breaker as open or closed. Circuits 451, 451, NAND-gate 455 and inverter 463 together act as an example of means connected to said means for producing the second signal for preventing said second signal if a voltage on either the first or second conductor is less than a predetermined voltage value.

Sync disagreement circuit 421 acts as an example of means connected to the means for producing the first signal and operable when the breaker is closed for generating a second signal when the phase difference of electrical energization of the first and second electrical conductors exceeds a predetermined value. Moreover, circuit 421 is an example of means for repeatedly determining whether the phase difference exceeds the predetermined value in different cycles of alternating current power electrically energizing the first and second electrical conductors. Circuit 401 is an example of means for repeatedly generating series of pulses each series corresponding in number to the phase difference of electrical energization of the first and second conductors. Counters 405 and 407 together act as an example of means for counting the pulses in each series. Circuits 411 and 421 together are an example of a means for producing the second signal (e.g. SD) if the number of pulses in the most recent series counted by the counting means at least equals a predetermined number.

A NOR-gate 471 has one input connected to the output of NAND gate 455 and another input connected to the output of a Schmitt NAND gate 473 which output is a qualifying low when both inhibit 25 INH/ is inactive high and 52b is high (breaker open). A Schmitt NAND gate 475 supplies an enabling low to phase accept circuit 435 when NOR-gate 471 output is high and a power-on reset circuit 479 qualifies NAND gate 475. In this way sync checking by phase accept circuit 435 is enabled when the breaker is open, both lines are live, inhibit 25 INH/ is released, and power is on.

Circuit 435 produces a phase accept PH. ACC. output high when it is enabled and the number of pulses 403 in each series is less than the predetermined number corresponding to the second phase window. This high actuates a PHASE ACCEPT light emitting diode (LED) 481 through an inverter 483. The high is also conducted to a phase accept PH. ACC. input of circuit 401.

Figure 3A:
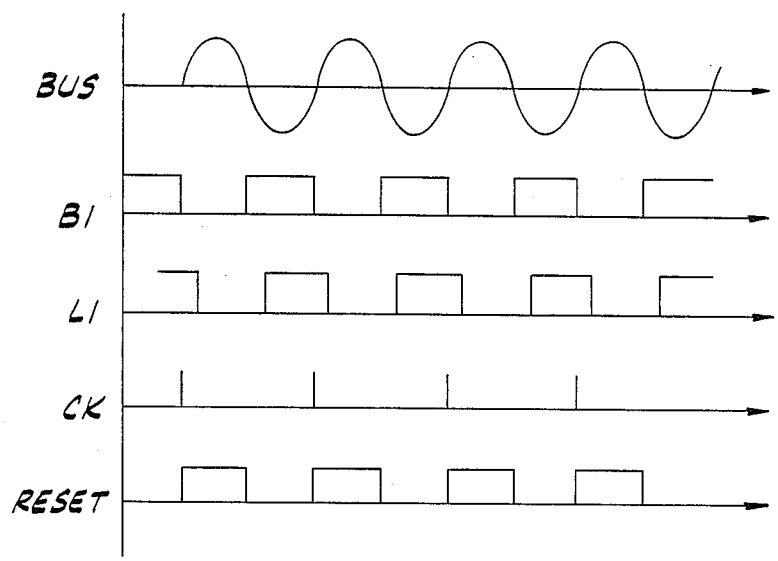
FIG. 3A is a timing diagram of several waveforms in the sync disagreement circuit of FIG. 3.

Counting in the circuitry of FIG. 3 is operative during the negative half cycles of the bus conductor B voltage. Circuit 401 provides a RESET pulse to reset counters 405 and 407 and other components during the entire positive half cycles, as shown in FIG. 3A. Circuit 401 also provides a clock CK pulse upon an occurrence of each positive going zero crossing of the bus voltage as also shown in FIG. 3A.

Sync disagreement circuit 421 has a flip-flop, or latch means, 491 with its set input connected to the output of NOR-gate 419. The reset input of flip-flop 491 is connected to the RESET output of circuit 401 and its low active output Q/ is connected to the data D input of a second flip-flop, or latch means, 493. Flip-flop 493 has its set S input connected to the output of NAND gate 461, and its reset R input connected to common. Flip-flop 493 has a clock C input connected to the clock CK output of circuit 401. An output Q/ of flip-flop 493 is connected through an inverter 495 to a Sync Disagreement LED 497. The output of inverter 495 is also connected to the cathode of an OR-ing diode 499, the anode of which is connected to the SD output of Sync Section 105. In this way, a high at Q/ output of flip-flop 493 turns on LED 497 and forces output SD low through inverter 495 and diode 499.

Operation of flip-flops 491 and 493 is controlled as follows. Until the breaker is closed and both lines are live, NAND gate 461 produces a disabling output high at the set input of flip-flop 493, forcing its Q/ output low. When the disabling output high is released, the output from NOR-gate 419 is inverted by flip-flop 491 and supplied to the D input of the flip-flop 493. If counting during a negative half cycle by counters 405 and 407, and comparison with the first phase window by circuit 411 determines that the first phase window is reached, the D input of flip-flop 493 is made low through flip-flop 491. Flip-flop 493 is clocked at the end of the negative half cycle, so that such D input low is clocked through flip-flop 493 to produce a Sync Disagreement Q/ output high. Flip-flop 491 is then reset from the RESET output of circuit 401 during the subsequent positive half cycle before counting is repeated. In the meantime, the flip-flop 493 Q/ output high is retained through the entire next cycle until flip-flop 493 is clocked again.

Flip-flop 491 is thus an example of a latch means which is set when a predetermined logic level occurs and reset on selected zero crossings of alternating current power electrically energizing one of the conductors (e.g. bus conductor B). Flip-flop 493 is an example of a second latch means connected to an output of the first-named latch means, and actuated in response to the selected zero crossings, the second latch means also being connected to the means for producing the first signal (e.g. 52b signal) so that the second latch means is cleared when the breaker is open, the second latch means having an output comprising the second signal.

The operation of phase accept circuit 435 is analogous to that of circuit 421. Phase accept circuit 435 has a flip-flop, or latch means, 511 with its set input connected to the output of NAND-gate 433. The reset input of flip-flop 511 is connected to the RESET output of circuit 401 and its low active output Q/ is connected to the data D input of a second flip-flop, or latch means, 513. Flip-flop 513 has its reset R input connected to the output of NAND gate 475, and its set S input connected to common. Flip-flop 513 has a clock C input connected to the clock CK output of circuit 401. An output Q of flip-flop 493 is connected through inverter 483 to Phase Accept LED 481. In this way, a high at Q output of flip-flop 513 turns on LED 481.

Operation of phase accept flip-flops 511 and 513 is controlled as follows. Until the breaker is open and sync check is permitted, NAND gate 475 produces a disabling output high at the reset input of flip-flop 513, forcing its Q output low. When the disabling output high is released, the output from NAND-gate 433 is inverted by flip-flop 511 and thereupon supplied from its Q/ output to the D input of the flip-flop 513. If counting during a negative half cycle by counters 405 and 407, and comparison with the second phase window by thumbwheels 429 determines that the second phase window is not reached (sync), the D input of flip-flop 513 is made high through flip-flop 511 because flip-flop 511 is not set by AND gate 433 to which thumbwheels 429 are connected. Flip-flop 513 is clocked at the end of the negative half cycle, so that such D input high is clocked through flip-flop 513 to produce a Phase Accept Q output high. In case flip-flop 511 had been set at its S input, it is then reset from the RESET output of circuit 401 during the subsequent positive half cycle before counting is repeated. In the meantime, the flip-flop 513 Q output high is retained through the entire next cycle until flip-flop 513 is clocked again.

In FIG. 4 the schematic diagram of circuit 401 of FIG. 3 has sync check circuitry of a Basler Electric Company BE1-25 sync check relay improved by adding a phase window adjusting circuit 550 of the invention. Circuit 550 is discussed in detail in connection with FIG. 5.

In FIG. 4 the sync check circuitry has an input section 560, a phase sensing section 570, and a timer and output section 580. Input section 560 detects zero crossings of the line and bus waveform and generates the RESET and clock CK outputs used in FIG. 3.

Phase sensing section 570 repeatedly produces series of pulses during each negative bus half cycle that in number correspond to the phase difference between the line and bus waveforms. This is accomplished by dividing the negative bus half cycle into 180 parts to determine the length of time represented by 1 degree, and then producing a series of pulses equal in number to the number of intervals of time between corresponding points on the waveforms of bus and line voltage. That number of intervals is the number of electrical degrees of phase difference.

Timer and output section 580 produces a Sync (25 RELAY) output and a 25 Logic Output if a condition of Phase Accept and acceptable vector voltage difference delta-V persist for a time interval established on thumbwheels.

In input section 560, the bus voltage waveform at input Bl is inverted, amplified and rectified in a circuit 601 so that pulses in FIG. 3A on the graph for Bl are supplied to a D input of a flip-flop 603. The line voltage waveform at input Ll is similarly inverted, amplified and rectified in a circuit 605 (identical to circuit 601) so that pulses in FIG. 3A on the graph for Ll are supplied to a D input of a flip-flop 607. A further flip-flop 609 has a D input connected to a low-active Q/ output of flip-flop 603. All three flip-flops 603, 607 and 609 have clock inputs which are fed at a 500 KHz. rate from a clock oscillator 611.

Flip-flop 603 provides a Q output high and Q/ output low during the negative half cycle of the bus waveform. Flip-flop 609 provides a Q output low delayed relative to output Q/ of flip-flop 603 by one 500 KHz. clock cycle. Flip-flop 607 provides a low-active Q/ output low during the negative half cycle of the line waveform. The Q outputs of flip-flops 603 and 609 are fed to the inputs of a NOR-gate 615 which produces the circuit 401 output clock CK, which is a single pulse coincident with the positive going zero crossing of the bus waveform, see FIG. 3A.

The Q output of flip-flop 609 when high comprises the RESET output of circuit 401. The RESET output is high active for purposes of controlling the circuitry of FIG. 3 as above-described. Due to the digital delaying action of flip-flop 609, RESET goes high upon the 500 KHz. clock cycle following output CK. In this way the reset function advantageously follows the operations clocking flip-flops 513 and 493 of FIG. 3.

In phase sensing section 570, a RCA 40103 binary down counter 623 repeatedly downcounts to zero from binary 10110011 (decimal 179) under control of 500 KHz. clock oscillator 611 during the positive half cycle of the bus waveform only. When zero count is reached a low is supplied from a carry out/zero detect CO/ZD/ output of downcounter 623. Down counter 623 is immediately reset to the 10110011 value due to a connection between the CO/ZD/ output and a synchronous preset enable SPE/ input of downcounter 623, whence downcounting continues so that a series of lows is fed to an up counter 625 during the positive half cycle. During the negative half cycle the Q/ output of flip-flop 603 is active low at an Asynchronous Preset Enable APE/ input of down counter 623 jamming the 1011011 value into it continually and preventing the production of any pulses at CO/ZD/ output. Up counter 625, which is reset by output CK at the beginning of each positive half cycle, thus counts up from zero during the positive half cycle, and then retains its count during the entire negative half cycle whence it is again reset. The count in counter 625 thus is the number of 500 KHz. clock cycles in one electrical degree.

Another RCA 40103 binary down counter 627 is enabled throughout the negative half cycle by the Q/ output low from flip-flop 603 supplied to its CI/CE/ low active chip enable input. However, the Q/ output low from flip-flop 607 continually presets down counter 627 at the J0-J6 inputs and prevents it from down counting except during a period when the line voltage is not negative. That period is proportional to the phase difference. When the line voltage is not negative, down counter 627 counts down to zero and produces a low-active CO/ZD/ pulse on line 631 after it has counted the number of 500 KHz. clock cycles in one electrical degree. The low pulse on line 631 is supplied to an input of a NOR-gate 633, the output of which goes high when the latest 500 KHz. clock pulse supplied to its other input is completed. The output of NOR-gate is connected to an input of a NOR-gate 635. Another input of NOR-gate 635 is connected to the Q/ output of flip-flop 603. The output of NOR-gate 635 goes low at an APE/ input of down counter 627 and jams the count from counter 625 into counter 627 so that the down counting process again occurs and so on over and over again during the entire interval of phase difference. In this way down counter 627 produces a series of low-active pulses that are supplied to phase window adjusting circuit 550 during the negative half cycle of the bus voltage waveform, the series having each pulse thereof corresponding to each degree of phase difference which is sensed.

In this way circuit 580 is an example of means for measuring the phase difference of electrical energization of the first and second electrical conductors by producing a series of pulses corresponding in number to the phase difference. Counters 405 and 407, thumbwheel switch 429 and phase accept circuit 435 together constitute an example of a means responsive to a number of the pulses for supplying a synchronism signal when the breaker is open and a preestablished value representing a phase window exceeds the number of pulses representing the phase difference.

The operation of the phase accept circuit 435 has been described in connection with FIG. 3. When sync occurs, a high appears at a PH. ACC. input to a Schmitt NAND gate 641 of FIG. 4. If vector voltage difference delta-V is small, a delta-V input to gate 641 also goes high, causing the output of gate 641 to go low. This releases a reset from a frequency divider 643 driven by clock oscillator 611. Frequency divider 643 produces pulses at a selectable 1 second or tenth second interval through an inverter 645 to a down counter 647. The low output of NAND gate 641 is inverted by a Schmitt inverter 651 that thereby releases a previous low from an APE/ input of down counter 647. The previous low thereat had preset the counter 647 with a time value set on a two-digit thumbwheel switch 653 of the same type as thumbwheel switch 429 of FIG. 3. If the phase accept and acceptable delta-V condition cause a high output from NAND gate 641 to persist for the period of time set on the thumbwheel switch 653, then counter 647 times out and sets a flip-flop 655. Flip-flop 655 produces a low at output Q/.

In an output portion of circuit 580, a NOR-gate has a first input connected to the output Q/ of flip-flop 655 and a second input connected to the output of another NOR-gate 663 which has 8 inputs connected to the thumbwheel switch 653. If the thumbwheels are set to zero, NOR-gate 663 produces an output high that causes NOR-gate 661 output to go low. The output of NOR-gate 661 is connected to a line 25 LOGIC OUT, and through an inverter 667 to a line 25 RELAY OUT, and through another inverter 669 to a SYNC LED 671. When NOR-gate 661 output goes high the Sync relay and Sync LED are prevented from operating. However, if the thumbwheel switch 653 is not set to zero and the down counter 647 reaches zero causing a timeout output low from the Q/ output of flip-flop 655, then NOR gate 661 output goes high, turning LED 671, actuating the 25 relay, and providing a high on 25 LOGIC OUT.

FIG. 5 shows the inventive phase window adjusting circuit 550 in schematic detail. Circuit 550 is an example of means responsive to a command signal (e.g. EXTEND/) and to the series of pulses for selectively altering the number of the pulses to which the output signal supplying means (see e.g. FIG. 3 counters 405 and 407 and circuits 411, 421, 492 and 435) is to be responsive. Circuit 550 is also an example of means responsive to the command signal for selectively preventing at least one of the pulses from the measuring means from affecting the output signal supplying means.

When the low active EXTEND/ input to Sync Section 105 of FIG. 3 and FIG. 5 is high (no phase window adjustment), a NOR-gate 711 is qualified by an output low from a Schmitt inverter 713 having its input connected to the EXTEND/ input. Low-active pulses from line 631 of FIG. 4 pass directly through NOR-gate 711 as highs to a NOR-gate 715 where they produce output lows without alteration for counting and comparison in FIG. 3. NOR-gates 711 and 715 thus act as a logic means having an input for the series of pulses and an output for connection to the output signal supplying means. However, if EXTEND/ goes low (phase window adjustment), then NOR-gate 711 is disabled by an input high from inverter 713, and provides an output low qualifying NOR-gate 715. A second Schmitt inverter 721 has its input connected to the output of inverter 713. The output of inverter 721 is connected to one input of a NOR-gate 723, qualifying it when EXTEND/ is low. The output of NOR gate 723 is connected to another input of NOR-gate 715.

With EXTEND/ low, the phase difference pulses on line 631 are fed through an inverter 729 to clock a decade counter 731 which has outputs for the numbers 2 and 3. A single-pole-double-throw switch 741 selects the decade counter output for a desired phase window adjustment multiple. (Smaller phase windows can be obtained by adjustment command in other embodiments of the invention by inserting pulses.)

When the decoder output "2" or "3" selected by switch 741 goes high, the high is innverted by an inverter 743 and supplied to an input of a NOR-gate 723, which is qualified as above-described when EXTEND/ is low. The output of NOR-gate 723 goes high and forces the output of NOR-gate 715 low. The just-mentioned low is a low-active pulse resulting from the phase window adjustment process. In this way circuit 550 supplies one output pulse for every N pulses on line 631, where N is a predetermined whole number, and selectively prevents at least one of the pulses from the measuring means (e.g. circuit 570 of FIG. 4) from affecting the output signal supplying means (e.g. circuit 435 of FIG. 3).

During the positive half cycle of the bus waveform, it is expected that there will be no pulses on line 631 in this preferred embodiment. For good measure, the RESET line which is high during the positive half cycle is connected to an input of a NOR-gate 751, the output of which is connected to a Schmitt inverter 753. A RESET high forces the output of NOR-gate 751 low causing a high at the output of inverter 753 which holds decade counter 731 reset at its reset input.

During the negative half cycle of the bus waveform, a pulse output low from NOR-gate 715 is also fed to an inverter 755 the resulting high output of which is connected to a second input of NOR-gate 751. The output of NOR-gate 751 is forced low, resetting decade counter 731 through inverter 753. Decade counter thereupon counts up again in response to any further pulses on line 631, repeatedly selecting one of every N pulses on line 631 and supplying the selected pulses as pulses 403 at the output of NOR-gate 715.

Inverter 713 thus acts as a means for deriving a command signal indicating when the phase window is to be adjusted. Circuit 550 of FIG. 5 also provides an EXTEND RELAY OUT signal to actuate an output relay. For this purpose, the output of inverter 721 is fed to the input of a Schmitt inverter 761 the output of which constitutes EXTEND LOGIC OUT. The output of inverter 761 also is fed to a noninverting relay driver circuit 763, the output of which is the EXTEND RELAY OUT signal.

Figure 6:
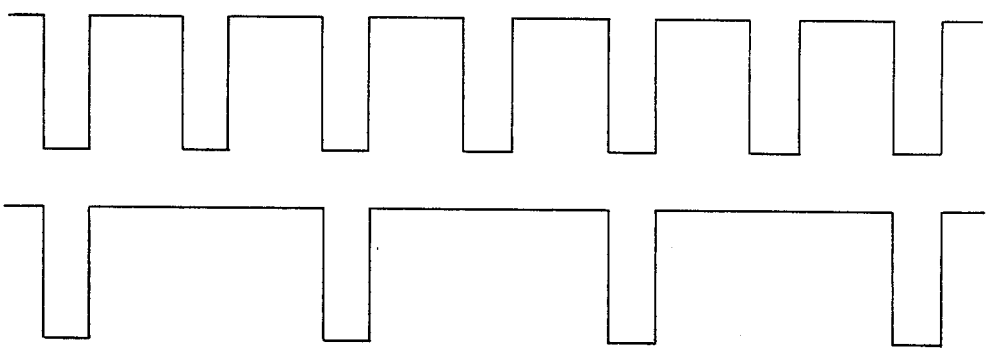
FIG. 6 is a diagram of pulses from the circuit of FIG. 4 which are selectively altered in number by the inventive phase window adjusting circuit of FIGS. 4 and 5.

In FIG. 6, several low-active pulses on line 631 are shown. Beneath them are pulses 403 resulting from the action of phase window adjusting circuit 550. Circuit 550 thus selectively prevents some of the pulses on line 631 from reaching the counting circuitry of FIG. 3 as pulses 403.

Figure 9:
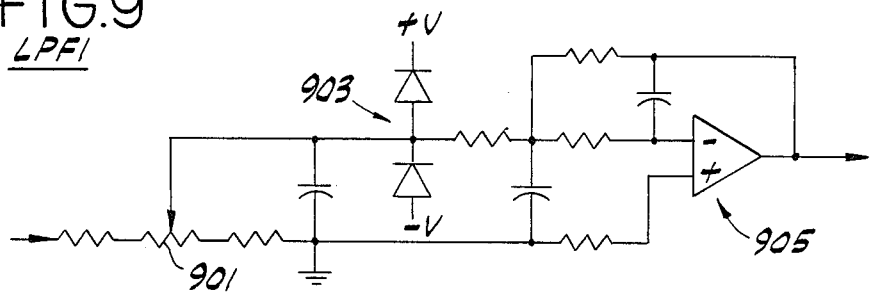
FIG. 9 is a schematic diagram of a low pass filter circuit used in the voltage monitor section of FIG. 7.
Figure 10:
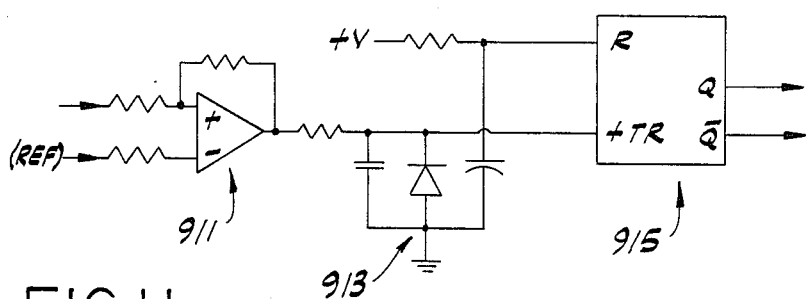
FIG. 10 is a schematic diagram of a comparing and one-shot circuit used in the voltage monitor section of FIG. 7.
Figure 11:
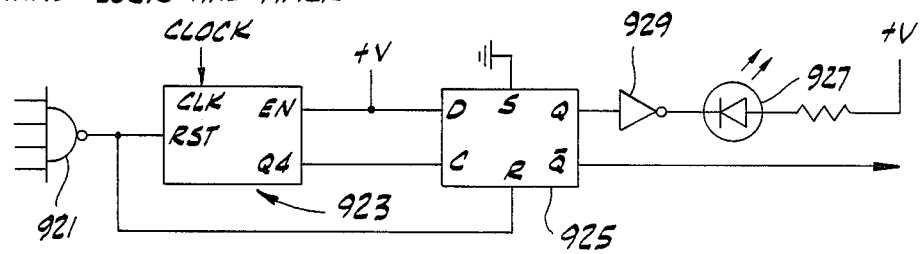
FIG. 11 is a schematic diagram of a NAND logic and timer circuit used in the voltage monitor section of FIG. 7.

In FIG. 7 Voltage Monitor circuit 103 of FIG. 2 is shown in detailed block diagram form, the blocks being detailed in schematic form in FIGS. 9-11.

Voltages from sensing transformers 81 and 83 correspond to the voltages on phase conductors A, B and C for both the line and bus. These voltages are low pass filtered in six low pass filter circuits LPF1 (schematic in FIG. 9) to produce outputs OAL and OAB for line and bus conductors A respectively, outputs OBL and OBB for line and bus conductors B respectively, and outputs OCL and OCB for line and bus conductors C respectively. Each pair of filtered outputs for line and bus conductors with the same letter designation such A is compared by a comparator to produce an output used in determining vector voltage difference. The phase A conductors are compared to produce output OAX, B conductors for output OBX and C conductors for output OCX. The foregoing identified outputs are connected to the identically identified inputs of a set of fifteen compare-and-one-shot circuits (schematic of one such circuit in FIG. 10) in an array 801. A set of user-variable reference voltages LLR (Live Line Reference), DLR (Dead Line Reference), LBR (Live Bus Reference), DBR (Dead Bus Reference), and deltaVR (Vector Voltage Difference Reference) are fed as shown to appropriate circuits in the array 801. Twelve of the fifteen outputs from array 801 represent voltage states of the line and bus as live or dead. These are OALL, OADL, OALB, OADB, OBLL, OBDL, OBLB, OBDB, OCLL, OCDL, OCLB AND OCDB. For example if OALB is high, then bus conductor A is live. If OBDB is high, then bus conductor B is dead. If OCLL is high, then line conductor C is live, and so on.

Array 801 thus constitutes an example of means for producing respective first inputs each indicating whether or not a corresponding conductor of the line is live, respective second inputs each indicating whether or not a corresponding conductor of the line is dead, respective third inputs each indicating whether or not a corresponding conductor of the bus is live, and respective fourth inputs each indicating whether or not a corresponding conductor of the bus is dead.

Also, in FIG. 7, an array of fourteen exclusive-OR gates (XOR) each have two inputs, for a total of 28 inputs. Each input of an XOR is marked with a designation of the input generated by the array 801 to which it is connected. For example, the OCDL input generated by the array 80130 is connected by a line to the OCDL input of array 803. This marking system is used to clarify the drawing and show all interconnections without using numerous lines on the drawing. An exclusive-OR gate is a logic gate which has an output high only when one of its inputs is high and the other is low.

The array of exclusive-OR gates thus acts to compare voltage states of the six conductors of the line and bus. For example, if conductor A of both the line and bus are both live, then both OALL and OALB are high inputs and a comparison of OALL and OALB results in an output low from the exclusive-OR gate 805 to which that pair of inputs is connected. In normal operation with the breaker closed, all of the comparisons made by array 803 should produce output low from all fourteen exclusive-OR gates. Accordingly, an OR-gate 807 has fourteen inputs connected to the output of each of the fourteen exclusive-OR gates in array 803. The output of OR-gate 807 is low only if all fourteen outputs of the exclusive-OR gates are low. If a discrepancy is detected in any pair of inputs to any of the exclusive-OR gates, then the output of OR-gate 807 goes high.

The output of OR-gate 807 is coupled through a noise filtering circuit 811 to one of six identical NAND-and-timer circuits of an array 821. Each of the circuits has the schematic diagram shown in FIG. 11. If the output of OR-gate 807 is high throughout a time period set by a NAND-and-timer circuit 823 when an input 52$b'$/ (high when breaker is closed) is high, then NAND-and-timer circuit 823 produces an output high to an inverter 825. The output of inverter 825 pulls output PD low through a diode 827. Such condition indicates that a voltage discrepancy is detected between the conductors of the line and bus with the breaker closed. The output PD low is coupled to the Logic Section 101 of FIG. 2, and if it persists for a preset length of time such as 5 seconds, the Alarm Out ALM OUT contact is actuated in FIG. 1 to indicate a circuit breaker malfunction.

In FIG. 7, the 52$b$ signal is processed by a circuit 831 consisting of a pullup resistor and noise filter capacitor followed by a Schmitt NAND gate which has inputs for 52$b$ and a power on reset circuit like 479 of FIG. 3. The output of the Schmitt NAND gate is 52$b'$/. This output is also inverted by an inverter 833 to produce an output 52$b'$ which is high when the breaker is open.

All six NAND logic and timer circuits in array 21 are fed with 10 Hz. clock pulses from a clock 841. Except for circuit 823 in the array 821, the other 5 circuits are qualified by the 52$b'$ input which is high when the breaker is open. These circuits have inputs connected to the array 801 as indicated by the letter designations thereon, and are used for voltage monitoring purposes in conjunction with sync section 105 of FIGS. 2-5. Array 821 thus produces an output for Live Line LL if all the line conductors have voltages that exceed a live threshold value LLR in array 801 for a predetermined time period set in the NAND-logic-and-timer circuit for LL. Also it produces an output for Dead Line or Line Not Overvoltage DL/OV/ if all the line conductors have voltages that are less than a threshold value DLR, which is set lower than LLR to detect a dead line or set higher than LLR to detect a line that is not overvoltage. Analogous outputs for Live Bus LB and Dead Bus or Bus Not Overvoltage DB/OV/ are also produced by array 821.

Figures 8A, 8B, 8C, 8D, 8E, 8F:
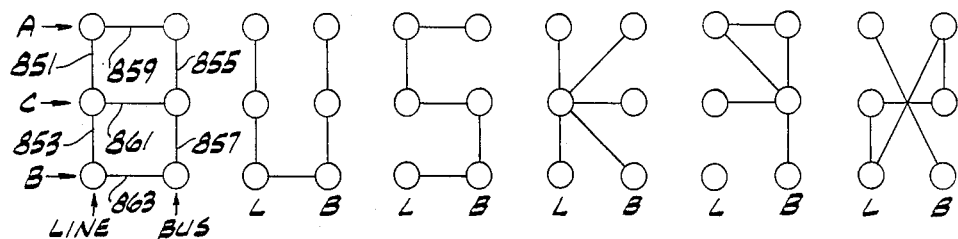
FIGS. 8A–8F are a set of diagrams for explaining a concept of linked comparisons used in the inventive circuitry for detecting a voltage discrepancy of FIG. 7.

FIG. 8A is a diagram of the comparisons made by exclusive-OR array 803 of FIG. 7. Six open circles are arranged in two columns of three circles. The column marked B has three circles representing the voltage states of the three bus conductors A, B, and C relative to a selected threshold value such as LLR. The column marked L has three circles representing the voltage states of the three line conductors A, B, and C relative to a particular value such as LBR which is suitably equal to LLR. Seven line segments in FIG. 8A join various pairs of the circles and correspond to comparisons of seven pairs of voltage states of the conductors of the phase and line made by array 803 of FIG. 7. In addition array 803 of FIG. 7 has seven additional exclusive-OR gates for comparing the same seven pairs of voltage states relative to a dead/not-overvoltage threshold which is distinct from the live threshold.

The diagram of array 803 of FIG. 7 is reduced to the diagram of FIG. 8A with respect to the "live" voltage states OALL, OALB, OBLL, OBLB, OCLL and OCLB as follows. The comparison in FIG. 7 between OALL and OCLL is represented by a line segment 851, between OCLL and OBLL by a line segment 853, between OALB and OCLB by a line segment 855, between OCLB and OBLB by a line segment 857, between OALL and OALB by a line segment 859, between OCLL and OCLB by a line segment 861, and between OBLL and OBLB by a line segment 863.

In other embodiments of the invention using various other comparisons, the comparisons are reduced to diagrams analogous to FIG. 8A according to the principles just discussed. Since these embodiments are numerous only a few examples are shown in FIGS. 8B–8F.

For example, in FIG. 8B five comparisons are made of voltage states with respect to a given threshold, and comparisons 859 and 861 of FIG. 8A are omitted. In FIG. 8C five comparisons are made but comparisons 853 and 855 of FIG. 8A are omitted this time. In FIG. 8D comparisons of the voltage states of all conductors are made to the voltage state of line conductor C exclusively. In FIG. 8E comparisons are made between all but one of the conductors, line conductor B. In FIG. 8F, comparisons are made among four of the conductors and an additional comparison is made between line conductor A and bus conductor B.

Array 801 of FIG. 7 is an example of means for producing respective first inputs each indicating whether or not the voltage on a corresponding conductor of the line exceeds a threshold and respective second inputs each indicating whether or not the voltage on a corresponding conductor of the bus exceeds a particular value. The arrangements in FIGS. 8A–8F all represent examples of means for comparing selected pairs of the first and second inputs and means for producing the second signal if any of the compared pairs is discrepant wherein the number of selected pairs is at least equal to one less than twice the number of phases of the line. For example, for a three phase line the number of selected pairs is at least 5 in the examples shown. FIGS. 8A and 8C each represent arrangements that are an example of means for comparing each of the first inputs with a corresponding one of the second inputs and comparing a pair of the first inputs and a pair of the second inputs.

FIGS. 8A, 8B, 8C and 8D each represent arrangements that are an example of means for performing comparisons between voltage states of the line and bus which comparisons are completely linked with respect to all conductors of the line and bus for comparison purposes. The phrase "completely linked" is adopted herein to describe a particularly advantageous set of embodiments wherein any further comparisons between voltage states relative to a given threshold are redundant because the completely linked comparisons are sufficient to detect any discrepancies that may exist. In other words, in a completely linked arrangement, there are no "islands" of comparison as in FIG. 8E where line conductor B is not compared, or as in FIG. 8F where conductors line A and bus B are only compared to each other. Put still more specifically, comparisons are completely linked when every subset of the conductors has at least one comparison between the voltage state of a conductor in the subset and the voltage state of a conductor outside of the subset. The least number of comparisons which are needed in an arrangement that is completely linked is equal to one less than twice the number of phases of the line.

For example, for a three-phase line and bus, 5 (five) comparisons are needed in an arrangement that is completely linked. FIGS. 8B and 8C represent arrangements that are completely linked and have exactly 5 comparisons. For a four-phase line and bus, 7 comparisons are needed in an arrangement that is completely linked, and so on. The foregoing remarks apply to comparisons involving a voltage state with respect to one threshold such as LLR. If more thresholds are employed, the number of comparisons is suitably multiplied by the number of thresholds. For example, in FIG. 7 the number of comparisons was doubled to account not only for the live threshold but also the dead/not-overvoltage threshold.

FIG. 9 shows a schematic diagram of one of the low pass filters of FIG. 7. The voltage to be filtered is input at left, adjusted in magnitude by a potentiometer, passed between protective clamp diodes 903 and filtered by an active low pass filter 905.

FIG. 10 shows a schematic diagram of one of the fifteen compare and one shot circuits in array 801. A voltage and a threshold voltage which is to be compared thereto are fed to inputs (at left) of a high gain operational amplifier which acts as a compare circuit. The output of the amplifier is filtered and clamped by a network 913 and fed to a one-shot multivibrator 915 set to produce a pulse of length between one and two cycle periods at the line frequency (30 milliseconds is adequate at 60 Hz. or 50 Hz.). The one-shot 915 has a high active Q output and a low-active Q/ output. The output of any particular block which is used in the circuit of FIG. 7 is indicated by the symbol Q or Q/ in array 801 of FIG. 7.

FIG. 11 shows a schematic of one of the six NAND logic and timer circuits in array 821 of FIG. 7. The circuit has a NAND gate with four inputs, the output of which is connected to a timer consisting of a binary up counter 923 feeding a Q4 (divide by 8) output to the clock input of a D flip-flop 925. 100 Hertz clock external to the circuit is fed to the clock input of counter 923. If the output of the NAND gate 921 is low (all inputs high) for the tenth-second period of the timer, then the Q output of flip-flop 925 goes high, turning on LED 927 through an inverter 929. Whenever the output of NAND gate 921 goes high, which indicates that one of the input levels has changed to a not true condition (e.g. OALL to not live-line), it immediately resets the counter 923 and flip-flop 925 of the timer to reestablish the recognition time for a given signal (LL, DL/OV/, LB, DB/OV/).

Figure 12:
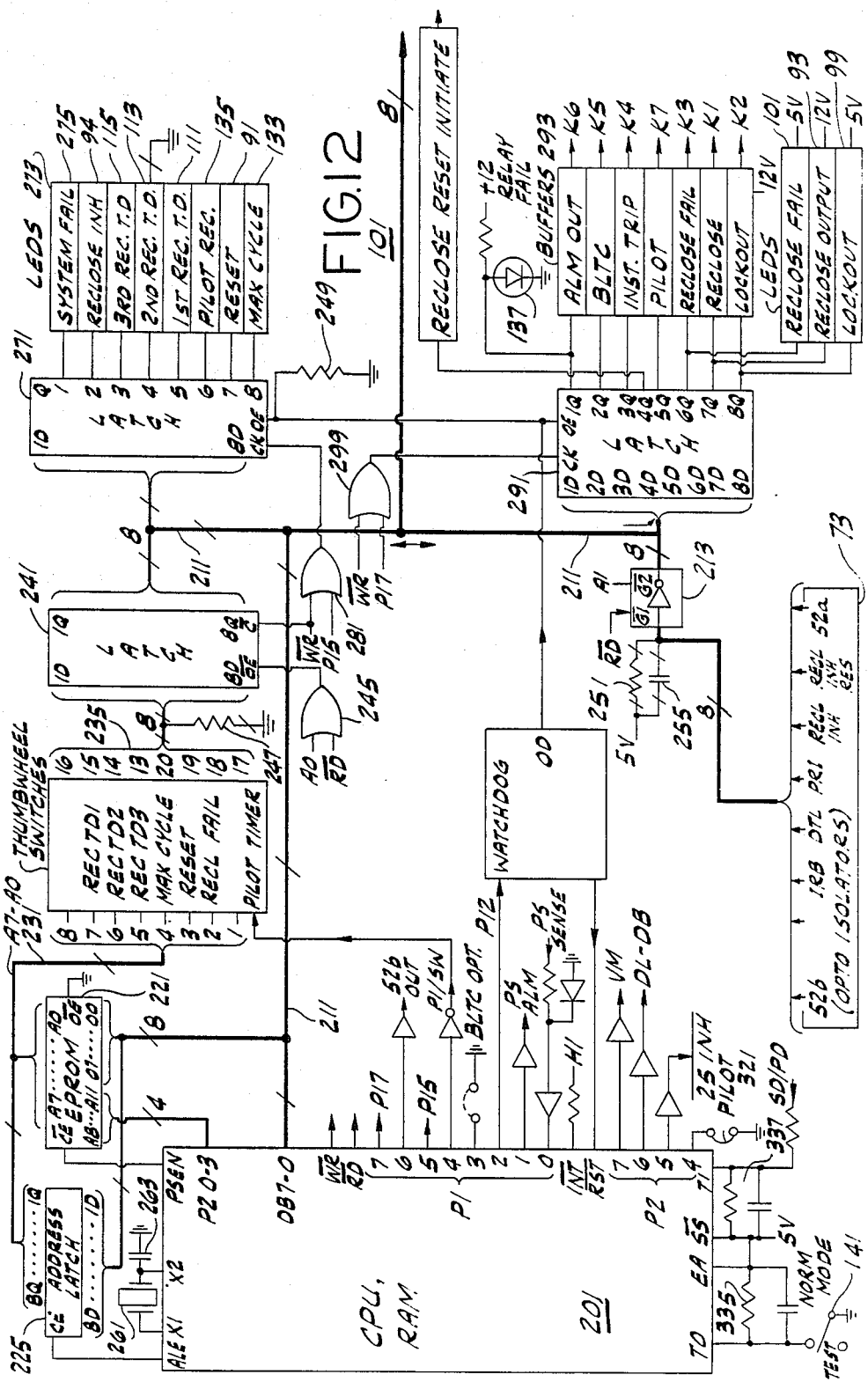
FIG. 12 is a schematic diagram of a microcomputer circuit used in the logic section of FIG. 2.
Figure 13:
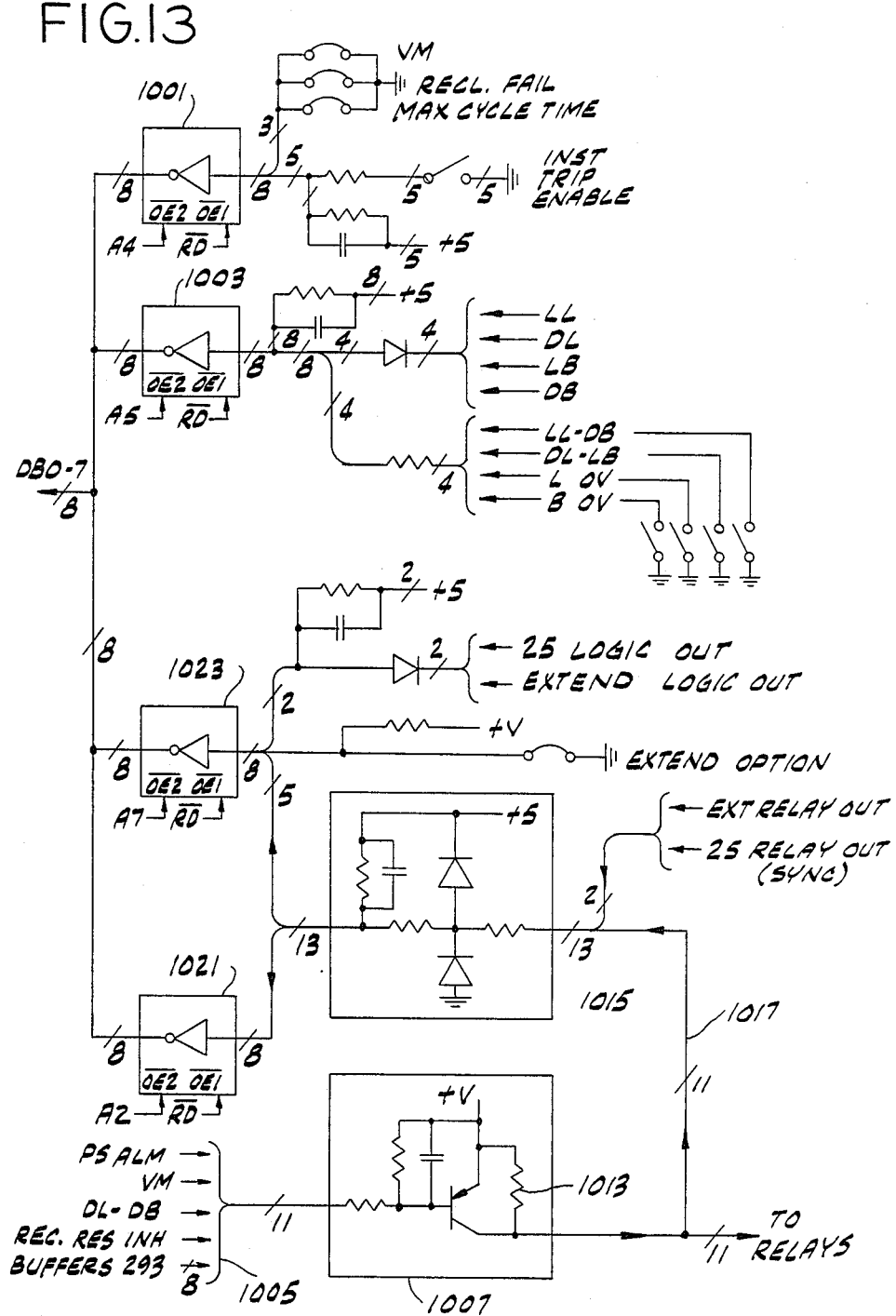
FIG. 13 is a schematic of additional input/output circuitry connected to the microcomputer circuit of FIG. 12.

FIGS. 12 and 13 show both halves of a schematic diagram of the Logic Section 101 of FIG. 2. The circuitry of FIG. 12 is similar to that of FIG. 10 of the cross-referenced application, and the description of that FIG. 10 suffices to describe FIG. 12 herein. Reference numerals in FIG. 12 are identical to those of FIG. 10 of the cross-referenced application. For purposes of the present disclosure, the Logic Section 101 has augmented the microprocessor circuit of FIG. 10 of the cross-referenced application by adding inputs and outputs in FIGS. 12 and 13 herein to accommodate the Voltage Monitor 103 and Sync Section 105 of FIG. 2.

In FIG. 12, the Sync Disagreement/Potential Disagreement SD/PD outputs from Sync Section 105 and Voltage Monitor 103 are resistively connected to testable input T1 of microcomputer 201. Microcomputer 201 is programmed to act as a timer. If the SD/PD line is low for a time period in excessive of a predetermined time period such as 5 second, then microcomputer 201 supplies an Alarm Output ALM OUT from the data bus DB port to latch 291 and then to the buffer marked ALM OUT in buffers 293 of FIG. 12.

In FIG. 13, sixteen inputs and jumper options are input through tristate buffers 1001 and 1003 to the 8-bit bus DB0–7. Eleven outputs 1005, including the ALM out line among the outputs of buffers 293 of FIG. 12, are fed to eleven relay drivers 1007 which are connected to eleven output relays 111 of FIG. 2. The relay coils are checked for continuity by means of a pullup resistor 1013 and sensing circuit 1015 respective to each relay. If the relay coil fails open, the pullup resistor pulls a respective one of a set of sensing lines 1017 high. A pair of additional tristate buffers 1021 and 1023 supply continuity data and other information to microcomputer 201 of FIG. 12, which outputs an ALM OUT signal.

FIG. 14 summarizes some important process or method steps in operating the preferred embodiment discussed hereinabove.

Operations commence with a START 1101 and proceed to a step 1103 to derive a breaker state signal logic level from the 52b contact input. In other words, step 1103 produces a first signal representative of the state of the breaker as open or closed.

Then, in a step 1105 operations proceed to derive a phase window adjusting command from an EXTEND contact input. Thus, in step 1105 a command signal is derived indicating when the phase window is to be adjusted. The phase window in different embodiments is adjusted to be either larger or smaller than the value originally set.

Next, in a step 1107, electrical quantities from the line and the bus are sensed, and pulses are produced corresponding in their number to the phase difference between the electrcial quantities sensed.

If in a step 1109 there is no command to adjust the phase window derived in step 1105, then operations proceed directly to a step 1111 to count the pulses and thereby ascertain a measure of the phase difference. However, if in step 1109 a command to adjust the phase window is present, then the number of pulses is altered in a step 1113 whence step 1111 is reached. The phase window is suitably extended (made larger) in step 1113 by preventing some of the pulses from being counted in step 1111 by disabling the counting process when such pulses are present, or by preventing some of the pulses from reaching a counter circuit. The phase window is suitably compressed or made smaller in step 1113 by supplying extra pulses corresponding to some or all of the pulses produced in step 1107.

After step 1111, operations proceed to a decision step 1115 to test when 52b is zero (breaker closed) whether it is true that either the number of pulses (step 1111) exceeds a first phase window, Phase Window 1, or that there is a discrepancy in the magnitudes of the voltages of the line and bus. If the test is true a second signal is produced, and operations proceed to a timing step 1117 and loop back to test 1115 until timeout, whence a step 1119 provides an indication of malfunction of the circuit breaker because of the occurrence of the second signal. Operations loop back from step 1119 to step 1103.

If the test 1115 is not true, then operations branch to a step 1121 to test whether 52b=1 (breaker open). If not, the breaker is closed, no malfunction is indicated and operations loop back to step 1103. If the breaker is open, operations proceed to a step 1123 to test whether a second phase window, Phase Window 2, exceeds the number of pulses as an indication of synchronism. If not, operations loop back to step 1103. If so, a timing step 1125 is performed which loops back to step 1123 until time out occurs, whence a step 1127 is reached. In step 1127, a synchronism condition is indicated by actuating a Sync relay and other outputs. Operations loop back from step 1127 to step 1103.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. Protective apparatus for use in an A.C. electrical power system with a circuit breaker for connecting and disconnecting first and second electrical conductors that are electrically energizable, the conductors normally having a negligible phase difference of electrical energization when the circuit breaker is closed, the circuit breaker having auxiliary contacts defining the state of the circuit breaker as open or closed, the protective apparatus comprising:
   means responsive to the auxiliary contacts for producing a first signal representative of the state of the breaker as open or closed;
   means connected to the means for producing the first signal and operable in response to the first signal for generating a second signal only when the breaker is closed and the phase difference of electrical energization of the first and second electrical conductors exceeds a predetermined value; and
   means for providing an alarm output representative of malfunction when the second signal occurs.

2. Protective apparatus as set forth in claim 1 wherein said means for generating the second signal includes means for determining whether the phase difference of the voltages of the first and second conductors exceeds the predetermined value.

3. Protective apparatus as set forth in claim 1 wherein said means for generating the second signal includes means for repeatedly determining whether the phase difference exceeds the predetermined value in different cycles of alternating current power electrically energizing the first and second electrical conductors.

4. Protective apparatus as set forth in claim 1 further comprising means for repeatedly generating series of pulses each series corresponding in number to the phase difference of electrical energization of the first and second conductors, and means for counting the pulses in each series; said means for generating the second signal including means for producing the second signal only when the breaker is closed if the number of pulses corresponding in number to the phase difference in the most recent series counted by the counting means at least equals a predetermined number.

5. Protective apparatus as set forth in claim 4 wherein said means for producing the second signal includes logic means connected to said counting means for producing a predetermined logic level if the number of pulses in a given series counted by the counting means reaches the predetermined number, and latch means which is set when the predetermined logic level occurs and reset on selected zero crossings of alternating current power electrically energizing one of the conductors.

6. Protective apparatus as set forth in claim 5 wherein said means for producing the second signal also includes second latch means connected to an output of the first-named latch means, said second latch means being actuated in response to the selected zero crossings, said second latch means having an output comprising the second signal.

7. Protective apparatus as set forth in claim 5 wherein said means for producing the second signal includes second latch means connected to an output of the first-named latch means wherein said second latch means has an output comprising the second signal and said second latch means is also connected to said means for producing the first signal so that said second latch means is cleared when the breaker is open.

8. Protective apparatus as set forth in claim 1 wherein the conductors are respectively parts of a polyphase line and polyphase bus and the apparatus further comprises means for providing a third signal only when the breaker is closed and a discrepancy occurs in the magnitudes of the voltages of the line and bus, said means for providing an alarm output representative of malfunction including means for producing the alarm output when either the second or third signal occurs.

9. Protective apparatus as set forth in claim 1 wherein the conductors are respectively parts of a polyphase line and polyphase bus and the apparatus further comprises means for providing a third signal including means for producing respective first inputs indicating whether or not the voltage on each conductor of the line exceeds a threshold value and respective second inputs indicating whether or not the voltage on each conductor of the bus exceeds a particular value, means for comparing selected pairs of the first and second inputs, and means for producing the third signal if any of the compared pairs is discrepant and the breaker is closed.

10. Protective apparatus as set forth in claim 1 further comprising means operable when the breaker is open for generating a synchronism signal when the phase difference is less than a preestablished value.

11. Protective apparatus as set forth in claim 1 further comprising means for measuring the phase difference of electrical energization of the first and second electrical conductors by producing a series of pulses corresponding in number to the phase difference and means responsive to a number of the pulses for supplying a synchronism signal when the breaker is open and a preestablished value representing a phase window exceeds the number of pulses representing the phase difference.

12. Protective apparatus as set forth in claim 11 further comprising means for deriving a command signal indicating when the phase window is to be adjusted, and means responsive to the command signal and to the series of pulses for selectively altering the number of the pulses that correspond in number to the phase difference to which said synchronism signal supplying means is responsive.

13. Protective apparatus as set forth in claim 11 further comprising means for deriving a command signal indicating when the phase window is to be extended, and means responsive to the command signal and to the series of pulses for selectively preventing at least one of the pulses that correspond in number to the phase difference from said measuring means from affecting said synchronism signal supplying means.

14. Protective apparatus as set forth in claim 1 further comprising means connected to said means for generating the second signal, for measuring the phase difference of electrical energization of the first and second electrical conductors by producing a series of pulses corresponding in number to the phase difference, said means for generating the second signal including means responsive to a number of the pulses for supplying the second signal when the breaker is closed and the number of pulses representing the phase difference at least equals a predetermined number corresponding to the predetermined value of phase difference.

15. Protective apparatus as set forth in claim 14 further comprising means responsive to the series of pulses for selectively altering the number of the pulses that correspond in number to the phase difference to which said means for supplying the second signal is responsive.

16. Protective apparatus as set forth in claim 1 further comprising means connected to said means for producing the second signal for preventing said second signal if a voltage on either the first or second conductor is less than a predetermined voltage value.

17. Protective apparatus for use in an A.C. electrical power system with a circuit breaker for connecting and disconnecting electrically energizable conductors of a polyphase line from corresponding electrically energizable conductors of a polyphase bus, the circuit breaker having auxiliary contacts defining the state of the circuit breaker as open or closed, the protective apparatus comprising:
  means responsive to the auxiliary contacts for producing a first signal representative of the state of the breaker as open or closed;
  means connected to the means for producing the first signal and operable in response to the first signal for providing a second signal only when the breaker is closed and a discrepancy occurs in the magnitudes of the voltages of the line and bus between conductors of the line, between conductors of the bus or between the line and the bus; and
  means for providing an alarm output representative of malfunction when the second signal occurs.

18. Protective apparatus as set forth in claim 17 wherein said means for providing the second signal includes means for producing respective first inputs each indicating whether or not the voltage on a corresponding conductor of the line exceeds a threshold value and respective second inputs each indicating whether or not the voltage on a corresponding conductor of the bus exceeds a particular value; means for comparing selected pairs of the first and second inputs and means for producing the second signal if any of the compared pairs is discrepant.

19. Protective apparatus as set forth in claim 17 wherein said means for providing the second signal includes means for producing respective first inputs each indicating whether or not the voltage on a corresponding conductor of the line exceeds a threshold value and respective second inputs each indicating whether or not the voltage on a corresponding conductor of the bus exceeds a particular value; and means for comparing selected pairs of the first and second inputs wherein the number of selected pairs is at least equal to one less than twice the number of phases of the line.

20. Protective apparatus as set forth in claim 17 wherein said means for providing the second signal includes means for performing comparisons between voltage states of the line and bus which comparisons are completely linked with respect to all conductors of the line and bus for comparison purposes.

21. Protective apparatus as set forth in claim 17 wherein said means for providing the second signal includes means for performing comparisons between voltage states of the line and bus which comparisons are completely linked with respect to all conductors of the line and bus for comparison purposes and are at least equal in number to one less than twice the number of conductors of the line.

22. Protective apparatus as set forth in claim 17 wherein said means for providing the second signal includes means for producing respective first inputs each indicating whether or not the voltage on a corresponding conductor of the line exceeds a threshold value and respective second inputs each indicating whether or not the voltage on a corresponding conductor of the bus exceeds a particular voltage value; and means for comparing each of the first inputs with a corresponding one of the second inputs and comparing a pair of the first inputs and a pair of the second inputs.

23. Protective apparatus as set forth in claim 17 wherein said means for providing the second signal includes means for producing respective first inputs each indicating whether or not a corresponding conductor of the line is live, respective second inputs each indicating whether or not a corresponding conductor of the line is dead, respective third inputs each indicating whether or not a corresponding conductor of the bus is live, and respective fourth inputs each indicating whether or not a corresponding conductor of the bus is dead; means for comparing pairs of the first inputs with each other, pairs of the second inputs with each other, pairs of the third inputs with each other, and pairs of the fourth inputs with each other; and means for producing the second signal if any of said compared pairs is discrepant.

24. For use in protective apparatus having means for measuring a phase difference between two electrical quantities by producing a series of pulses corresponding in number to the phase difference and means responsive to a number of the pulses for supplying an output signal indicating whether or not a preestablished value representing a phase window exceeds the number of pulses representing the phase difference, a phase window adjusting apparatus comprising:
means for deriving a command signal indicating when the phase window is to be adjusted; and means responsive to the command signal and to the series of pulses for selectively altering the number of the pulses that correspond in number to the phase difference to which pulses the output signal supplying means is to be responsive.

25. For use in protective apparatus having means for measuring a phase difference between two electrical quantities by producing a series of pulses corresponding in number to the phase difference and means responsive to a number of the pulses for supplying an output signal indicating whether or not a preestablished value representing a phase window exceeds the number of pulses representing the phase difference, a phase window adjusting apparatus comprising:
means for deriving a command signal indicating when the phase window is to be extended; and means responsive to the command signal for selectively preventing at least one of the pulses in the series of pulses corresponding in number to the phase difference from the measuring means from affecting the output signal supplying means.

26. Phase window adjusting apparatus as set forth in claim 25 wherein said preventing means includes logic means having an input for the series of pulses corresponding in number to the phase difference and an output for connection to the output signal supplying means, and means responsive to the command signal for controlling said logic means when said command signal indicates that the phase window is to be extended so that only one of every N of said pulses, where N is a predetermined whole number, is allowed to reach the output signal supplying means.

27. Phase window adjusting apparatus as set forth in claim 26 wherein said controlling means includes a counter which is clocked by said series of pulses corresponding in number to the phase difference and supplies an output pulse every N pulses and means for resetting said counter when the output pulse occurs.

28. In protective apparatus having means for measuring a phase difference between two electrical quantities by producing a series of pulses corresponding in number to the phase difference and means responsive to the number of pulses for supplying an output signal indicating whether or not the phase difference is less than a preestablished value representing a phase window, a phase window adjusting means responsive to an external command signal for selectively preventing at least one of the pulses in the series of pulses corresponding in number to the phase difference from said measuring means from affecting said output signal supplying means.

29. In protective apparatus as set forth in claim 28 said preventing means including logic means having an input for the series of pulses and an output connected to the output signal supplying means, and means responsive to the command signal for controlling said logic means when said command signal indicates that the phase window is to be extended so that only one of every N pulses, where N is a predetermined number, is permitted to reach the output signal supplying means.

30. In protective apparatus as set forth in claim 29 said controlling means including a counter which is clocked by said series of pulses and supplies an output pulse every N pulses, and means for resetting said counter when each output pulse occurs.

31. A method of operating protective apparatus having means for measuring a phase difference between two electrical quantities by producing a series of pulses corresponding in number to the phase difference, means for setting a preestablished value representing a phase window and means responsive to a number of the pulses for supplying an output signal if the phase window exceeds the phase difference, the method comprising the steps of:
deriving a command signal indicating when the phase window is to be adjusted without affecting the preestablished value of the setting means; and
selectively altering, in response to the series of pulses that correspond in number to the phase difference, the number of said pulses to which the output signal supplying means is responsive, when said command signal occurs.

32. A method of operating protective apparatus for use in an A.C. electrical power system with a circuit breaker for connecting and disconnecting electrically energizable conductors of a polyphase line from corresponding electrically energizable conductors of a polyphase bus, the circuit breaker having auxiliary contacts defining the state of the circuit breaker as open or closed, the method comprising the steps of:

producing a first signal representative of the state of the breaker as open or closed;

providing a second signal only when the breaker is closed and a discrepancy occurs in the magnitudes of the voltages of the line and bus between conductors of the line, between conductors of the bus or between the line and bus; and providing an alarm output representative of malfunction when the second signal occurs.

33. A method of operating protective apparatus for use in an A.C. electrical power system with a circuit breaker for connecting and disconnecting first and second electrical conductors that are electrically energizable, the conductors normally having a negligible phase difference of electrical energization when the circuit breaker is closed, the circuit breaker having auxiliary contacts defining the state of the circuit breaker as open or closed, the method comprising the steps of:

producing a first signal representative of the state of the breaker as open or closed;

generating a second signal only when the breaker is closed and the phase difference of electrical energization of the first and second electrical conductors exceeds a predetermined value; and providing an alarm output representative of malfunction when the second signal occurs.

34. Protective apparatus for use in an A.C. electrical power system with a circuit breaker for connecting and disconnecting first and second electrical conductors that are electrically energizable, the conductors normally having a negligible phase difference of electrical energization when the circuit breaker is closed, the circuit breaker having auxiliary contacts defining the state of the circuit breaker as open or closed, the protective apparatus comprising:

means responsive to the auxiliary contacts for producing a first signal representative of the state of the breaker as open or closed;

means connected to the means for producing the first signal and operable in response to the first signal for generating a second signal only when the breaker is closed and the phase difference of electrical energization of the first and second electrical conductors exceeds a predetermined value; and malfunction timer means operable in resonse to the second signal for providing an alarm output representative of malfunction when a condition persists in excess of a predetermined time period wherein the breaker is closed and the phase difference of electrical energization of the first and second electrical conductors exceeds the predetermined value.

35. Protective apparatus as set forth in claim 34 further comprising means connected to said means for producing the second signal for sensing a voltage on the first electrical conductor and a voltage on the second electrical conductor and means for preventing said second signal if either of the voltages as sensed is less than a predetermined voltage value.

36. Protective apparatus as set forth in claim 35 further comprising warning alarm means for providing a warning alarm indication of malfunction of the circuit breaker in response to the alarm output of said malfunction timer means.

37. Protective apparatus as set forth in claim 34 wherein said means for generating the second signal includes means for repeatedly determining whether the phase difference exceeds the predetermined value in different cycles of alternating current power electrically energizing the first and second electrical conductors.

38. Protective apparatus as set forth in claim 34 wherein said malfunction timer means includes a microcomputer.

39. Protective apparatus as set forth in claim 34 further comprising relay contacts operable in response to the alarm output of said malfunction timer means.

40. Protective apparatus for use in an A.C. electrical power system with a circuit breaker for connecting and disconnecting electrically energizable conductors of a polyphase line from corresponding electrically energizable conductors of a polyphase bus, the circuit breaker having auxiliary contacts defining the state of the circuit breaker as open or closed, the protective apparatus comprising:

means responsive to the auxiliary contacts for producing a first signal representative of the state of the breaker as open or closed;

means connected to the means for producing the first signal and operable in response to the first signal for generating a second signal only when the breaker is closed and a discrepancy occurs in the magnitudes of the voltages of the line and bus between conductors of the line, between conductors of the bus or between the line and bus; and malfunction timer means operable in response to the second signal for providing an alarm output representative of malfunction when a condition persists in excess of a predetermined time period wherein the breaker is closed and the discrepancy in the magnitudes of voltages is present.

41. Protective apparatus as set forth in claim 40 further comprising means connected to the means for producing the first signal and operable in response to the first signal for generating a third signal only when the breaker is closed and the phase difference of electrical energization of a first electrical conductor in the line and a second corresponding electrical conductor in the bus exceeds a predetermined value, said malfunction timer means including means operable in response to the third signal for providing the alarm output representative of malfunction when a condition persists in excess of a preset time interval wherein the breaker is closed and the phase difference of electrical energization of the first and second electrical conductors exceeds the predetermined value.

42. Protective apparatus as set forth in claim 40 wherein said malfunction timer means includes a microcomputer.

43. Protective apparatus as set forth in claim 40 further comprising relay contacts operable in response to the alarm output of said malfunction timer means.

44. Protective apparatus as set forth in claim 40 wherein said means for providing the second signal includes means for producing respective first inputs each indicating whether or not the voltage on a corresponding conductor of the line exceeds a threshold value and respective second inputs each indicating whether or not the voltage on a corresponding conductor of the bus exceeds a particular value; means for comparing selected pairs of the first and second inputs according to comparisons which are completely linked with respect to all conductors of the line and bus for comparison purposes and are at least equal in number to one less than twice the number of conductors of the line, and means for producing the second signal if any of the compared pairs is discrepant.

45. Protective apparatus as set forth in claim 40 wherein said means for providing the second signal includes means for producing respective first inputs each indicating whether or not the voltage on a corresponding conductor of the line is greater than a threshold value, respective second inputs each indicating whether or not the voltage on a corresponding conductor of the line is less than a particular value, respective third inputs each indicating whether or not the voltage on a corresponding conductor of the bus is greater than a threshold value, and respective fourth inputs each indicating whether or not the voltage on a corresponding conductor of the bus is less than a particular value; means for comparing selected pairs of the first and third inputs and also comparing selected pairs of the second and fourth inputs according to comparisons which are completely linked with respect to all conductors of the line and bus for comparison purposes and are at least equal in number to one less than twice the number of conductors of the line, and means for producing the second signal if any of the compared pairs is discrepant.

* * * * *